(12) United States Patent
Schwartz

(10) Patent No.: US 9,758,641 B2
(45) Date of Patent: Sep. 12, 2017

(54) NANOCLAY HYBRIDS AND ELASTOMERIC COMPOSITES CONTAINING SAME

(71) Applicant: T.G.L. S.P. Industries Ltd., Yokneam (IL)

(72) Inventor: Adam Schwartz, Haifa (IL)

(73) Assignee: T.G.L. S.P. Industries Ltd., Yokneam (IL)

( * ) Notice: Subject to any disclaimer, the term of this patent is extended or adjusted under 35 U.S.C. 154(b) by 0 days.

(21) Appl. No.: 13/949,456

(22) Filed: Jul. 24, 2013

(65) Prior Publication Data

US 2014/0031468 A1 Jan. 30, 2014

Related U.S. Application Data

(63) Continuation-in-part of application No. 13/546,228, filed on Jul. 11, 2012, now abandoned.

(60) Provisional application No. 61/506,377, filed on Jul. 11, 2011, provisional application No. 61/753,424, filed on Jan. 16, 2013.

(51) Int. Cl.
| C08K 9/04 | (2006.01) |
| C01B 33/44 | (2006.01) |
| C08K 3/34 | (2006.01) |
| C08K 5/17 | (2006.01) |
| C08K 9/06 | (2006.01) |
| C08K 5/18 | (2006.01) |

(52) U.S. Cl.
CPC ............... *C08K 9/04* (2013.01); *C01B 33/44* (2013.01); *C08K 3/346* (2013.01); *C08K 5/17* (2013.01); *C08K 9/06* (2013.01); *C08K 5/18* (2013.01)

(58) Field of Classification Search
CPC .. C08L 21/00; C08L 9/06; C08K 5/17; C08K 9/04; C08K 9/06; C08K 5/18; C08K 3/346; C01B 33/44
USPC .......................................... 524/188; 556/173
See application file for complete search history.

(56) References Cited

U.S. PATENT DOCUMENTS

| 2,966,282 A | 12/1960 | Geisler |
| 3,791,557 A | 2/1974 | Venus, Jr. |
| 3,981,415 A | 9/1976 | Fowler et al. |
| 4,008,831 A | 2/1977 | Vidilles |
| 4,077,543 A | 3/1978 | Kulikowski et al. |
| 4,121,737 A | 10/1978 | Kain |
| 4,222,499 A | 9/1980 | Lee et al. |
| 4,251,032 A | 2/1981 | Werding |
| 4,458,830 A | 7/1984 | Werding |
| 4,573,992 A | 3/1986 | Marx |
| 4,574,746 A | 3/1986 | Keyes, IV et al. |
| 4,785,972 A | 11/1988 | LeFevre |
| 4,964,540 A | 10/1990 | Katz |
| 4,981,238 A | 1/1991 | Wenmaekers |
| 5,014,881 A | 5/1991 | Andris |
| 5,060,700 A | 10/1991 | Wenmaekers |
| 5,080,652 A | 1/1992 | Sancoff et al. |
| 5,111,971 A | 5/1992 | Winer |
| 5,127,554 A | 7/1992 | Loychuk |
| 5,303,853 A | 4/1994 | Nye |
| 5,526,957 A | 6/1996 | Brown et al. |
| 5,927,551 A | 7/1999 | Taylor et al. |
| 6,407,155 B1 | 6/2002 | Qian et al. |
| 6,413,239 B1 | 7/2002 | Burns et al. |
| 6,793,090 B2 | 9/2004 | Ackerman et al. |
| 6,818,693 B2 | 11/2004 | Heinrich et al. |
| 2003/0172801 A1 | 9/2003 | Reininger |
| 2005/0027058 A1 | 2/2005 | Dias et al. |
| 2006/0243741 A1 | 11/2006 | Schiefer |
| 2007/0193669 A1 | 8/2007 | Giannini et al. |
| 2007/0267437 A1 | 11/2007 | Nimmo et al. |
| 2008/0272145 A1 | 11/2008 | Nimmo et al. |
| 2009/0045222 A1 | 2/2009 | Nimmo et al. |
| 2009/0047969 A1 | 2/2009 | Lee et al. |
| 2010/0133295 A1 | 6/2010 | Chan et al. |
| 2011/0060086 A1 | 3/2011 | Rodgers et al. |
| 2011/0108574 A1 | 5/2011 | Nimmo et al. |
| 2011/0130507 A1 | 6/2011 | Leu et al. |
| 2012/0004347 A1 | 1/2012 | Ratnayake et al. |

(Continued)

FOREIGN PATENT DOCUMENTS

| CN | 101058650 | 10/2007 |
| CN | 101735493 | 6/2010 |

(Continued)

OTHER PUBLICATIONS

Bhattacharya et al., "Tailoring Properties of Styrene Butadiene Rubber Nanocomposite by Various Nanofillers and Their Dispersion," Polym Eng Sci, vol. 49, No. 1, Jan. 2009, pp. 81-98.*
JP 2004-137431 A (2004), machine translation, JPO Japan Platform for Patent Information (J-PlatPat).*
Baharvand et al., "SBR Composites Reinforced with N-Isopropyl-N'-phenyl-p-phenylenediamine-modified clay," Chin. J. Polym. Sci., vol. 29, No. 2, pp. 191-196, Mar. 2011 (published online Oct. 18, 2010).*
Communication Relating to the Results of the Partial International Search Dated Jun. 4, 2014 From the International Searching Authority Re. Application No. PCT/IL2014/050059.

(Continued)

*Primary Examiner* — Susannah Chung
*Assistant Examiner* — Josephine Chang

(57) ABSTRACT

A methodology for producing modified nanoclays which, when added to an elastomer, provide elastomeric nanocomposites with improved ageing, rheological and mechanical properties, and which can be devoid of, or containing low amount of, a filler such as carbon black, is provided. The modified nanoclays are made of a nanoclay, such as an organomodified nanoclay, modified so as to be in association with an amine-containing antioxidant and optionally also with a silyl-containing compound, such as mercaptosiloxane. Also provided are processes of preparing the modified nanoclays, elastomeric composites containing same and articles containing the elastomeric composites.

28 Claims, 20 Drawing Sheets
(3 of 20 Drawing Sheet(s) Filed in Color)

(56) References Cited

U.S. PATENT DOCUMENTS

| | | | |
|---|---|---|---|
| 2012/0097706 A1 | 4/2012 | Nimmo et al. | |
| 2013/0072607 A1 | 3/2013 | Schwartz | |
| 2013/0345647 A1 | 12/2013 | Har-Shai | |
| 2015/0307258 A1 | 10/2015 | Har-Shai et al. | |
| 2015/0368438 A1 | 12/2015 | Schwartz et al. | |

FOREIGN PATENT DOCUMENTS

| | | | |
|---|---|---|---|
| CN | 102504361 | | 6/2012 |
| EP | 0248755 | | 12/1987 |
| EP | 0300886 | | 1/1989 |
| EP | 0324289 | | 7/1989 |
| EP | 0178573 | | 2/1992 |
| EP | 1026102 | | 8/2000 |
| EP | 1851135 | | 7/2008 |
| EP | 1984279 | | 11/2009 |
| EP | 2188191 | | 6/2011 |
| EP | 2129598 | | 4/2012 |
| EP | 2188962 | | 10/2012 |
| EP | 2509267 | | 10/2012 |
| EP | 2597834 | | 5/2013 |
| GB | 1463336 | | 2/1977 |
| GB | 2209056 | | 4/1989 |
| GB | 2262312 | | 6/1993 |
| GB | 2278823 | | 12/1994 |
| JP | 2004137431 | A * | 5/2004 |
| WO | WO 88/00563 | | 1/1988 |
| WO | WO 95/09784 | | 4/1995 |
| WO | WO 01/15583 | | 3/2001 |
| WO | WO 03/022711 | | 3/2003 |
| WO | WO 2004/080841 | | 9/2004 |
| WO | WO 2005/113660 | | 12/2005 |
| WO | WO 2007/093889 | | 8/2007 |
| WO | WO 2010/069341 | | 6/2010 |
| WO | WO 2010/085979 | | 8/2010 |
| WO | WO 2010/145677 | | 12/2010 |
| WO | WO 2011/139545 | | 11/2011 |
| WO | WO 2012/117401 | | 9/2012 |
| WO | WO 2013/008241 | | 1/2013 |
| WO | WO 2014/111939 | | 7/2014 |
| WO | WO 2014/111940 | | 7/2014 |

OTHER PUBLICATIONS

International Search Report and the Written Opinion Dated Jun. 23, 2014 From the International Searching Authority Re. Application No. PCT/IL2014/050060.
Huang et al. CN 101735493, Database WPI [Online], Thomson Scientific, XP002725326, Week 201050, Database Accession No. 2010-J38836, 2010. Abstract.
Lv et al. CN 102504361, Database WPI [Online], Thomson Scientific, XP002725327, Week 201253, Database Accession No. 2012-J53639, 2012. Abstract.
Zhang CN101058650, Database WPI [Online], Thomson Scientific, XP002725328, Week 200822, Database Accession No. 2008-D03393, 2008. Abstract.
International Preliminary Report on Patentability Dated Sep. 12, 2013 From the International Bureau of WIPO Re. Application No. PCT/IL2012/050063.
International Search Report and the Written Opinion Dated Sep. 30, 2014 From the International Searching Authority Re. Application No. PCT/IL2014/050059.
Schwartz "Nanocomposites for Advanced Elastomers", The 4th International Conference on Nanotechnology for the Plastics & Rubber Industries, Ramat Gan, Israel, Feb. 2, 2009, 37 P., Feb. 2009.
Ansarifar et al. "Optimising the Chemical Bonding Between Silanised Silica Nanofiller and Natural Rubber and Assessing Its Effects on the Properties of the Rubber", International Journal of Adhesion and Adhesives, 26(6): 454-463, Sep. 2006. Abstract.
Bai et al. "Reinforcement of Hydrogenated Carboxylated Nitrile-Butadiene Rubber With Exfoliated Graphene Oxide", Carbon, 49: 1608-1613, 2011.
Das et al. "Reinforcement and Migration of Nanoclay in Polychloroprene/Ethylene-Propylene-Diene-Monomer Rubber Blends", Composites Science and Technology, 71: 276-281, 2011.
Koo "Closite Additives," Polymer Nanocomposites: Processing, Characterization, and Applications, Chapter 2: pp. 16-19. McGraw-Hill: New York, New York (2006).
Struktol "Struktol® TS 30, Struktol® TS 30-DL, Struktol® TS 35, Struktol® TS 35-DL. Tackifiers and Softeners", Technical Data Sheet, Schill + Seilacher Struktol Company of America, 1 P., 2004.
International Search Report and the Written Opinion Dated Dec. 20, 2012 From the International Searching Authority Re. Application No. PCT/IL2012/050360.
International Search Report and the Written Opinion Dated Jul. 30, 2012 From the International Searching Authority Re. Application No. PCT/IL2012/050063.
Das et al. "Nanocomposite Based on Chloroprene Rubber: Effect of Chemical Nature and Organic Modification of Nanoclay on the Vulcanizate Properties", European Polymer Journal, XP025628032, 44(11): 3456-3465, Nov. 1, 2008.
Kim et al. "Fabrication of Aligned Carbon Nanotube-Filled Rubber Composite", Scripta Materialia, XP002678869, 54: 31-35, 2006.
Communication Pursuant to Article 94(3) EPC Dated Jan. 7, 2015 From the European Patent Office Re. Application No. 12714383.2.
Kim et al. "SBR/Organoclay Nanocomposites for the Application on Tire Tread Compounds" Macromolcular Research. 17(10): 776-784, 2009.
International Preliminary Report on Patentability Dated Jul. 30, 2015 From the International Bureau of WIPO Re. Application No. PCT/IL2014/050059.
International Preliminary Report on Patentability Dated Jul. 30, 2015 From the International Bureau of WIPO Re. Application No. PCT/IL2014/050060.
Office Action Dated Jan. 11, 2016 From the Israel Patent Office Re. Application No. 220867 and Its Translation Into English.
Communication Pursuant to Article 94(3) EPC Dated Jul. 19, 2016 From the European Patent Office Re. Application No. 12714383.2.
Communication Pursuant to Article 94(3) EPC Dated Jul. 19, 2016 From the European Patent Office Re. Application No. 14705582.6.
Communication Pursuant to Article 94(3) EPC Dated Sep. 27, 2016 From the European Patent Office Re. Application No. 14708959.3.
Office Action dated Mar. 15, 2017 From the Israel Patent Office Re. Application No. 220867 and Its Translation Into English. (6 Pages).

* cited by examiner

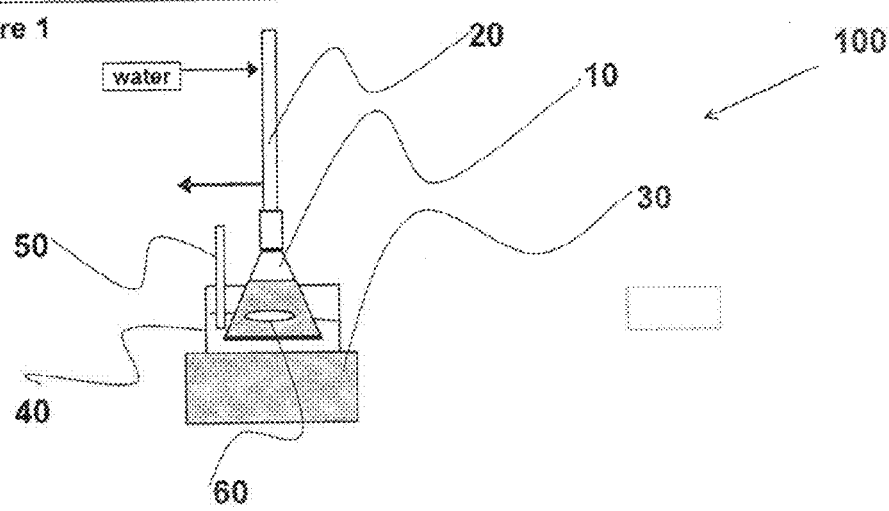
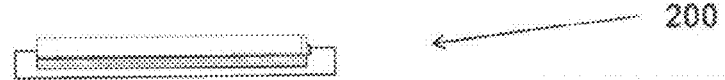

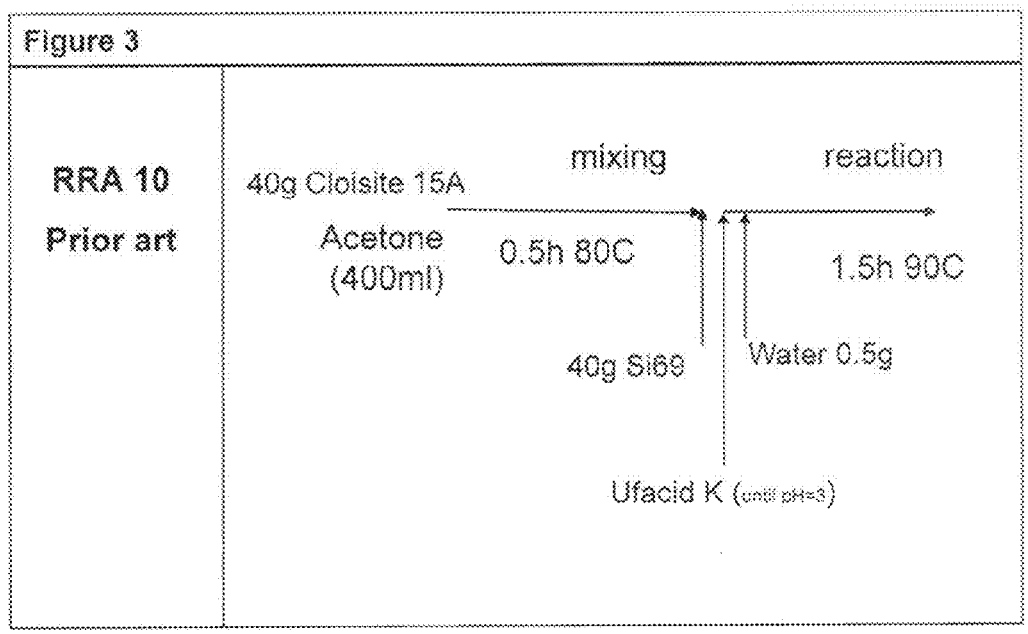

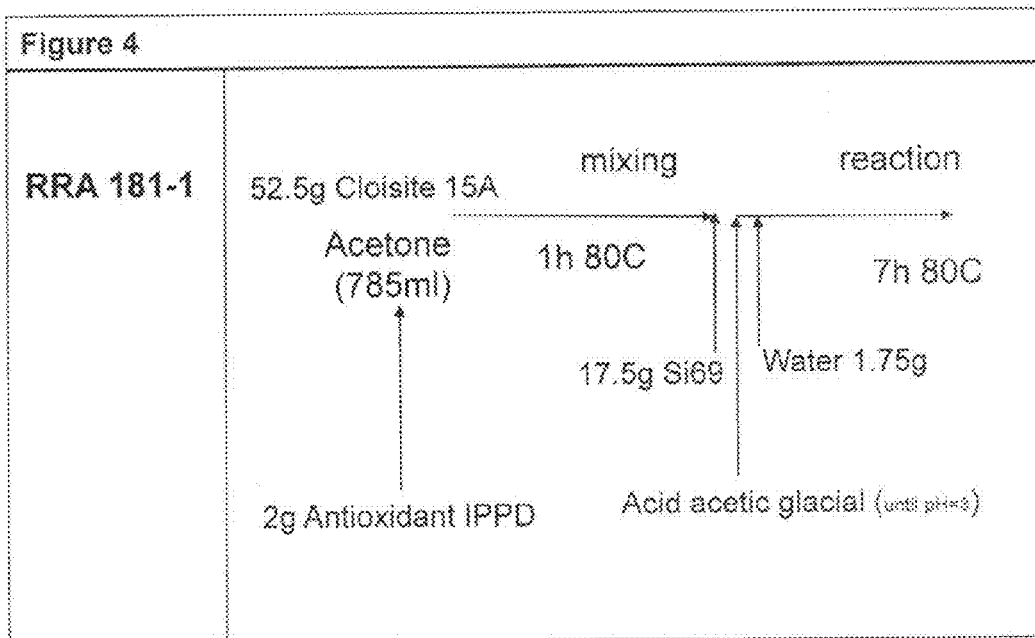

*FTIR spectra comparison wave length:2000-4000* ial Patent Application No. 61/506,377, filed Jul. 11, 2011.
NANOCLAY HYBRIDS AND ELASTOMERIC COMPOSITES CONTAINING SAME

RELATED APPLICATIONS

This application is a Continuation-In-Part (CIP) of U.S. patent application Ser. No. 13/546,228, filed Jul. 11, 2012, which claims the benefit of priority under 35 USC §119(e) of U.S. Provisional Patent Application No. 61/506,377, filed Jul. 11, 2011.

This application also claims the benefit of priority under 35 USC §119(e) of U.S. Provisional Patent Application No. 61/753,424, filed Jan. 16, 2013.

The contents of the above applications are all incorporated by reference as if fully set forth herein in their entirety.

FIELD AND BACKGROUND OF THE INVENTION

The present invention, in some embodiments thereof, relates to material science and, more particularly, but not exclusively, to newly modified nanoclays, processes of producing same and elastomeric composites containing same.

Synthetic rubbers are typically made of artificial elastomers. An elastomer is a viscoelastic polymer, which generally exhibits low Young's modulus and high yield strain compared with other materials. Elastomers are typically amorphous polymers existing above their glass transition temperature, so that considerable segmental motion is possible. At ambient temperatures, rubbers are thus relatively soft (E of about 3 MPa) and deformable.

Elastomers are usually thermosetting polymers (or copolymers), which require curing (vulcanization) for crosslinking the polymer chains. The elasticity is derived from the ability of the long chains to reconfigure themselves to distribute an applied stress. The covalent cross-linking ensures that the elastomer will return to its original configuration when the stress is removed. Elastomers can typically reversibly extend from 5% to 700%.

Synthetic elastomer is typically made by the polymerization of a variety of petroleum-based precursors called monomers. The most prevalent synthetic elastomers are styrene-butadiene rubbers (SBR) derived from the copolymerization of styrene and 1,3-butadiene. Other synthetic elastomers are prepared from isoprene (2-methyl-1,3-butadiene), chloroprene (2-chloro-1,3-butadiene), and isobutylene (methylpropene) with a small percentage of isoprene for cross-linking. These and other monomers can be mixed in various proportions to be copolymerized to produce products with a range of physical, mechanical, and chemical properties.

SBR rubber is mostly used in tires production, which accounts for about half of the world consumption, over 10 million tons per year, of synthetic rubber.

Synthetic rubbery materials often further include, in addition to a rubbery polymer or copolymer such as SBR copolymer, ingredients which may impart to the rubber certain desirable properties. The most commonly utilized ingredients are those that cause crosslinking reactions when the polymeric mix is cured (or vulcanized), which are usually consisting of sulfur and one or more "accelerators" (e.g., sulfenamides, thiurams or thiazoles), which make the sulfur cross-linking faster and more efficient.

Two other ingredients that play an important role in vulcanization chemistry are known as "activators," and commonly include zinc oxide and stearic acid. These compounds react together and with accelerators to form a zinc-containing intermediate compounds, which plays a role in the formation of sulfur crosslinks.

Many other materials have been added to synthetic rubbers, mostly with the aim of hardening it or reducing its production cost. The most commonly practiced materials, which are referred to herein and in the art as fillers or reinforcing agents, include finely divided carbon black and/or finely divided silica.

Both carbon black and silica, when added to the polymeric mixture during rubber production, typically at a concentration of about 30 percent by volume, raise the elastic modulus of the rubber by a factor of two to three, and also confer remarkable toughness, especially resistance to abrasion, on otherwise weak materials such as SBR. If greater amounts of carbon black or silica particles are added, the modulus is further increased, but the strength may be lowered.

However, reinforcement of rubbers with carbon black or silica may disadvantageously result in rubbers characterized by lower springiness (resilience) and decreased stiffness after flexing. Elastomeric composites containing carbon black and silica are thus relatively brittle at low temperatures. Furthermore, the preparation of elastomeric composites containing CB or silica is difficult.

Studies have shown that for a filler to be reinforcing, the filler particles must have small diameter, at the nanometer range, for instance 10-50 nm, and must be well-adhered by the elastomer.

To this effect, studies have focused in recent years on the developments of hybrid (nanofiller-fibre) nanocomposites as an alternative to heavily filled elastomers. Such a nanofiller is typically made of nanoparticles, such as nanoclays, which are clays modified so as to obtain clay complexes that are compatible with organic monomers and polymers (also referred to herein and in the art as compatibilizers).

Nanoclays are easily compounded and thus present an attractive alternative to traditional compatibilizers. Nanoclays have been known to stabilize different crystalline phases of polymers, and to possess the ability of improving mechanical and thermal properties. For improved performance and compatibility, nanoclays are typically modified so as to be associated with organic moieties, and the modified nanoclays are often referred to as organomodified nanoclays. Organomodified nanoclays are typically prepared by treatment with organic salts. Negatively charged nanoclays (e.g., montmorillonites) are typically modified with cationic surfactants such as organic ammonium salts or organic phosphonium salts, and positively charged nanoclays (e.g., LDH) are typically modified by anionic surfactants such as carboxylates, sulfonates, etc. Exemplary organomodified montmorillonites are disclosed in Kim et al., Macromolecular Research, Vol. 17(10), pp. 776-785 (2009); in U.S. Pat. Nos. 6,818,693 and 6,407,155; and in WO 2005/113660.

The effect of nanoclays modified by hydrolysed mercaptosilane, as a substitute for carbon black, on the properties of SBR compounds, was reported at the 4$^{th}$ International Conference on nanotechnology for the plastics & rubber industries, http://wwwdotplasticdotorgdotil/nano/nano_02_09_shenkar/PresNanolFeb_09_adamd otppt#2.

In short, it was reported that modified nanoclays may be produced by reacting nanoclays (NCs) such as organomodified montmorillonites (OMMT, e.g., Cloisite 30B), with mercaptosilanes. Such hybrids have been found useful in at least partially substituting for carbon black in elastomeric composites.

Additional background art includes Amit Das, Francis Reny Costa, Udo Wagenknecht, Gert Heinrich, European Polymer Journal 44 (2008) 3456-3465, available at wwwdotelsevierdotcom/locate/europolj; Das, R. N. Mahaling, K. W. Stöckelhuber, G. Heinrich. Composites Science and Technology, Issue 71 (2011), Pages 276-281, available at wwwdotelsevierdotcom/locate/compscitech; Yoong Ahm Kim, Takuaya Hayashi, Morinobu Endo, Yasuo Gotoh, Noriaki Wada, Junji Seiyama. Scripta Materialia, Issue 54 (2006), Pages 31-35, available at wwwdotsciencedirectdotcom; and Xin Bai, Chaoying Wan, Yong Zhang, Yinghao Zhai. Carbon, Volume 49, Issue 5, April 2011, Pages 1608-1613, available at wwwdotelsevierdotcom/locate/carbon.

SUMMARY OF THE INVENTION

In a search for improved nanoclays and improved elastic composites containing same, the present inventors have designed and successfully practiced a novel methodology for preparing improved and diverse organomodified nanoclays. The present inventor has utilized the newly modified nanoclays for producing synthetic rubbers with improved properties and performance. The newly designed modified nanoclays include an amine-containing compound that features antioxidation activity, in association with the nanoclay. In addition, a silyl-containing compound and ammonium, ammonium and/or phosphonium salts can be in association with the nanoclays.

According to an aspect of some embodiments of the present invention there is provided a composition-of-matter comprising a modified nanoclay, the modified nanoclay comprising a nanoclay being in association with an amine-containing compound featuring antioxidation activity.

According to some embodiments of the invention, the nanoclay is montmorillonite.

According to some embodiments of the invention, the nanoclay is an organomodified nanoclay, in which the nanoclay is in association with a surface modifying agent.

According to some embodiments of the invention, the surface modifying agent is a cationic surfactant.

According to some embodiments of the invention, the cationic surfactant is selected from the group consisting of an organic ammonium salt and an organic phosphonium salt.

According to some embodiments of the invention, the cationic surfactant is selected from the group consisting of a tallow ammonium salt and a tallow amminium salt.

According to any of the above-described embodiments of the invention, the amine-containing compound featuring an anti-oxidation activity is selected from the group consisting of a para-phenylenediamine (p-PDA), a substituted ethylene diurea (EDU) and a substituted amine having at least one hydrocarbyl chain of at least 4 carbon atoms.

According to some embodiments of the invention, the para-phenylene diamine compound is selected from the group consisting of a N,N-dialkyl-para-phenylenediamine (N,N-dialkyl-p-PDA) and a N-alkyl-para-phenylenediamine (N-alkyl-N-aryl-p-PDA).

According to any one of the above-described embodiments of the invention, the composition-of-matter further comprises a silyl-containing compound.

According to some embodiments of the invention, the silyl-containing compound is a mercaptosilyl compound.

According to some embodiments of the invention, the silyl-containing compound is a siloxane.

According to some embodiments of the invention, the silyl-containing compound is a mercaptosiloxane.

According to any one of the above-described embodiments of the invention, the composition-of-matter further comprises silica.

According to any one of the above-described embodiments of the invention, the composition-of-matter further comprises an accelerator (e.g., MBS or TBBS).

According to any one of the above-described embodiments of the invention, the composition-of-matter comprises a plurality of modified nanoclays as described herein.

According to an aspect of some embodiments of the present invention there is provided a process of preparing the composition-of-matter described herein, the process comprising:

reacting a nanoclay and the amine-containing compound featuring an antioxidation property in a solvent, to thereby obtain the modified nanoclay, thereby obtaining the composition-of-matter.

According to some embodiments of the invention, the nanoclay is an organomodified nanoclay in which the nanoclay is in association with a surface active agent.

According to some embodiments of the invention, the composition-of-matter further comprises a silyl-containing compound, the process comprising reacting the nanoclay, the amine-containing compound and the silyl-containing compound, in the solvent, to thereby obtain the modified nanoclay.

According to some embodiments of the invention, such a process comprises: reacting the (optionally organomodified) nanoclay, the amine-containing compound and the solvent; and subsequent to the reacting, adding the silyl-containing compound, and reacting the (optionally organomodified) nanoclay, the amine-containing compound, the silyl-containing compound in the solvent.

According to some embodiments of the invention, the composition-of-matter further comprises an accelerator, the process further comprising adding the accelerator, prior to or concomitant with, reacting the (optionally organomodified) nanoclay and the amine-containing compound.

According to some embodiments of the invention, the composition-of-matter further comprises silica, the process further comprising adding the silica, subsequent to reacting the (optionally organomodified) nanoclay and the amine-containing compound.

According to any one of the above-described embodiments of the invention, the solvent is selected from the group consisting of an organic solvent and a mixture of an organic solvent and water.

According to some embodiments of the invention, the organic solvent is selected from the group consisting of acetone, isopropyl alcohol, chloroform and any combination thereof.

According to some embodiments of the invention, the mixing comprises stirring at an elevated temperature.

According to some embodiments of the invention, the process further comprises drying the composition-of-matter.

According to an aspect of some embodiments of the present invention there is provided a composition-of-matter, prepared by the process as described herein.

According to an aspect of some embodiments of the present invention there is provided an elastomeric composite comprising an elastomer and the nanoclay or the composition-of-matter as described herein.

According to some embodiments of the invention, the elastomer is selected from the group consisting of an SBR elastomer, an isoprene elastomer, a polybutadiene elastomer, a butadiene acrylonitrile elastomer, an EPDM elastomer, a natural rubber and any combination thereof.

According to some embodiments of the invention, the elastomeric composite is devoid of carbon black.

According to some embodiments of the invention, the elastomeric composite further comprises carbon black at a concentration lower than 20 phr.

According to some embodiments of the invention, the elastomeric composition is characterized by a rheological property and/or a mechanical property as described herein.

According to an aspect of some embodiments of the present invention there is provided an article-of-manufacturing, comprising the elastomeric composition as described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 5:
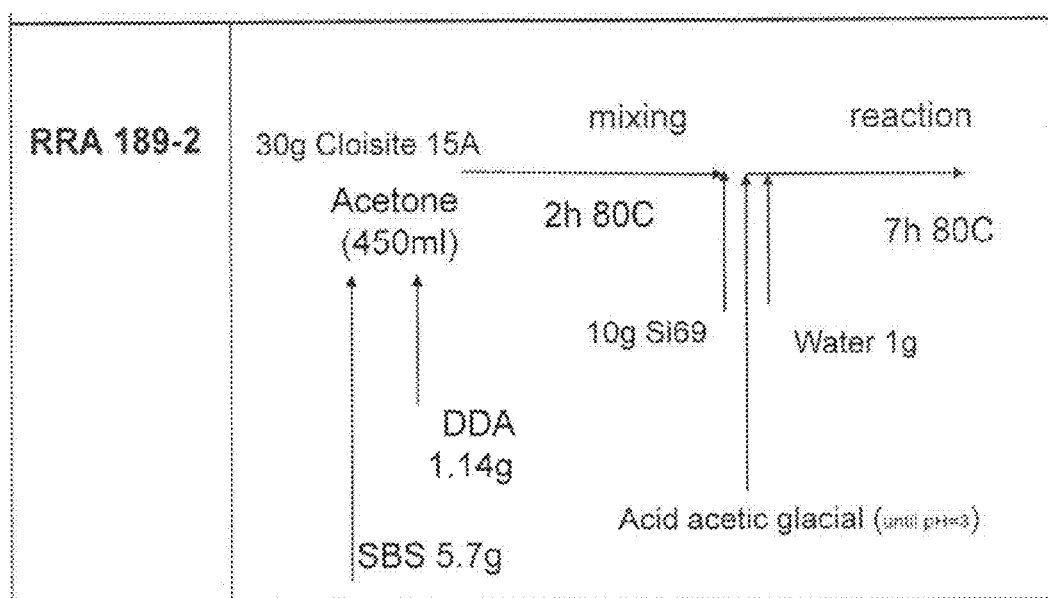
Figure 6:
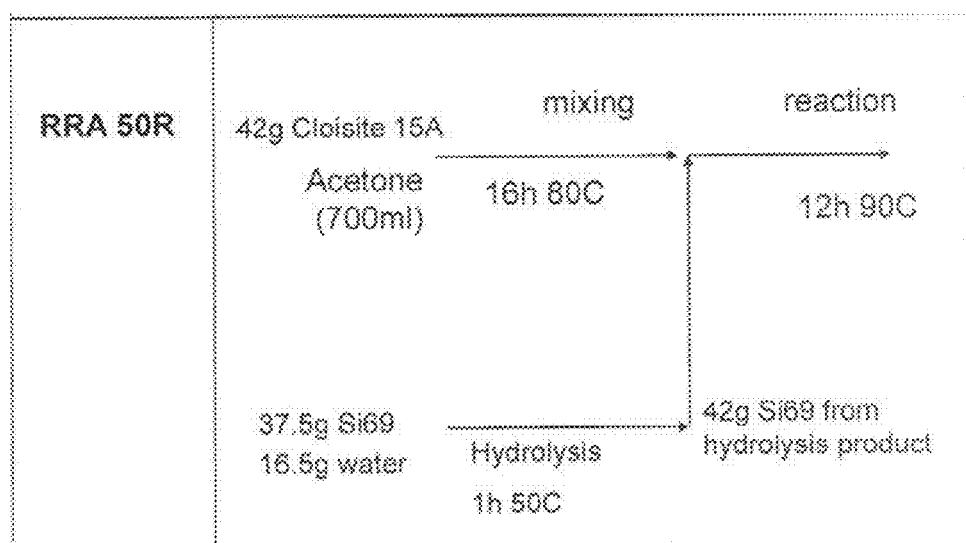
Figure 7:
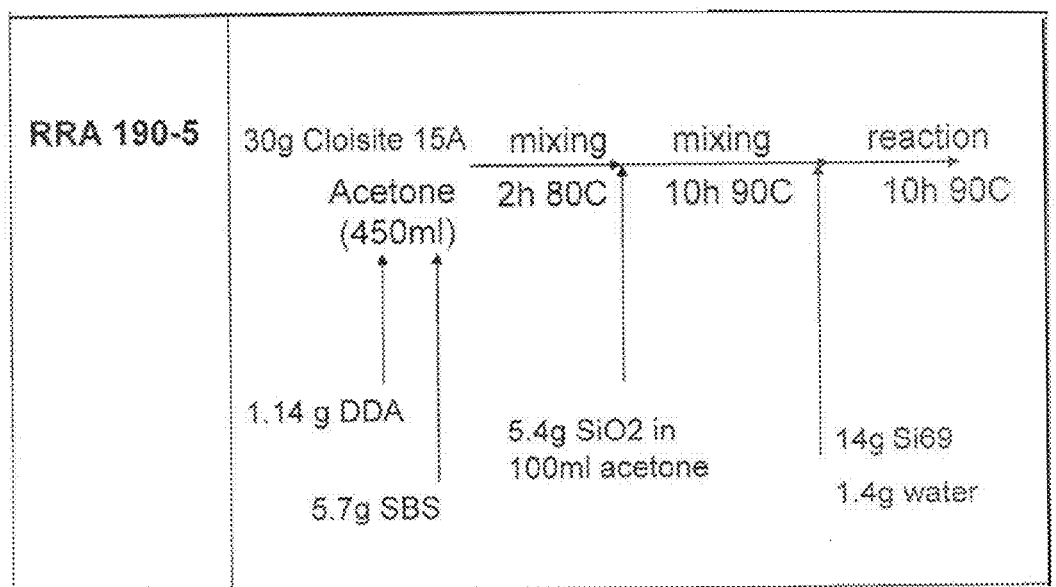
Figure 8:
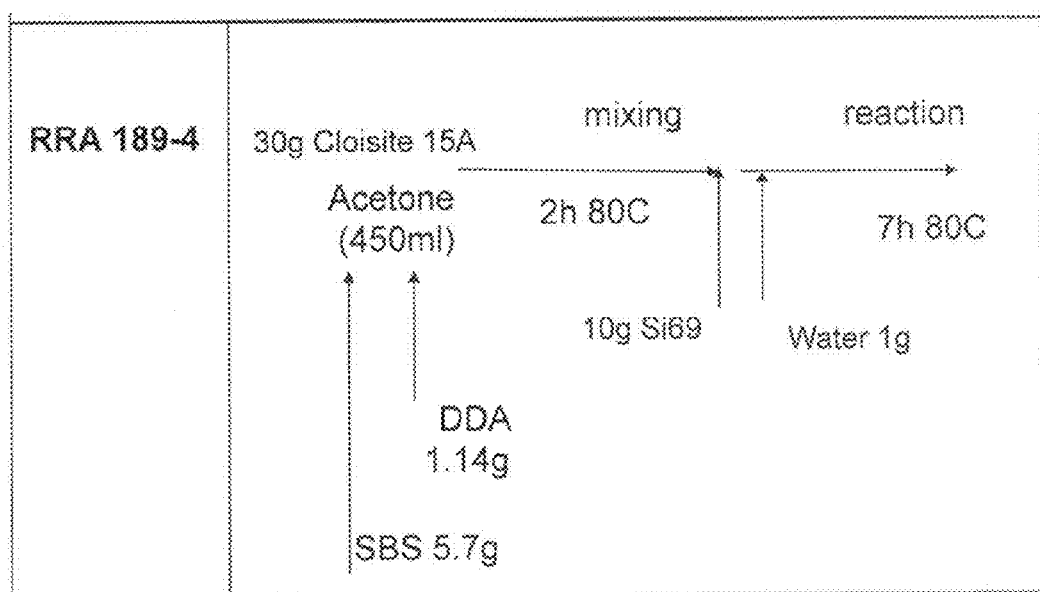
Figure 9:
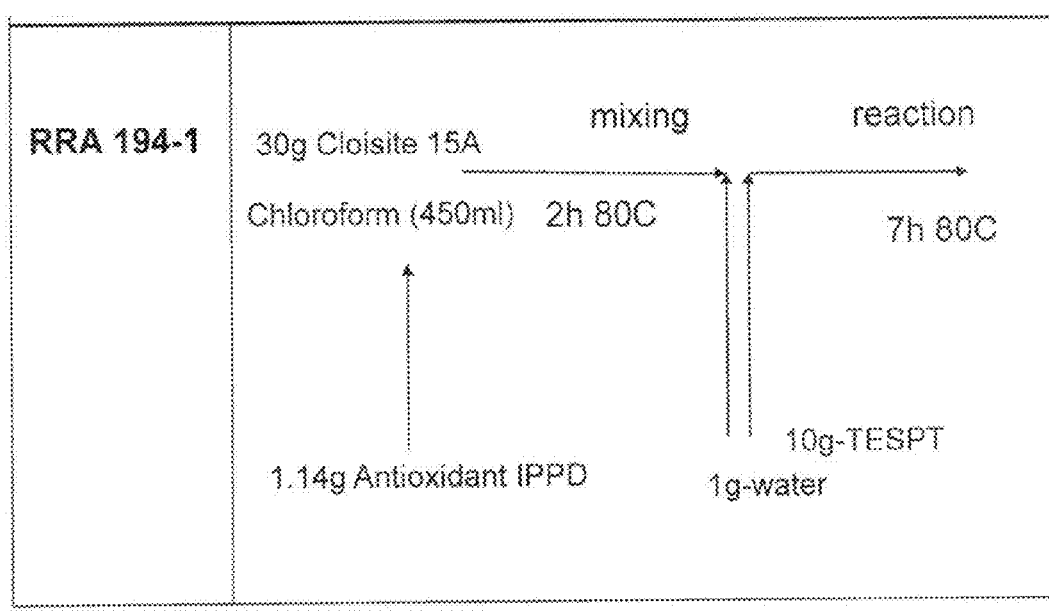
Figure 10:
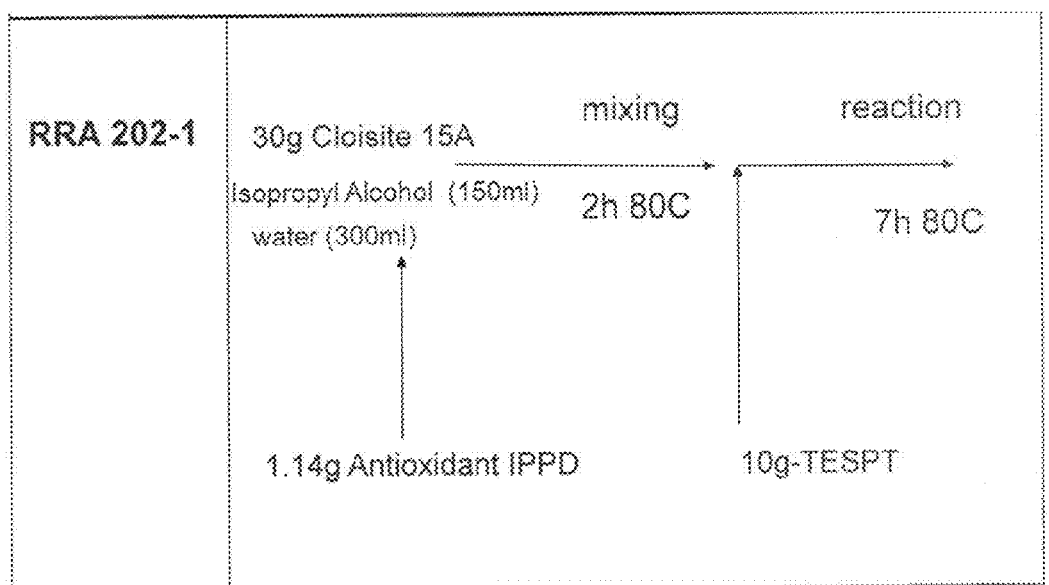
Figure 11A:
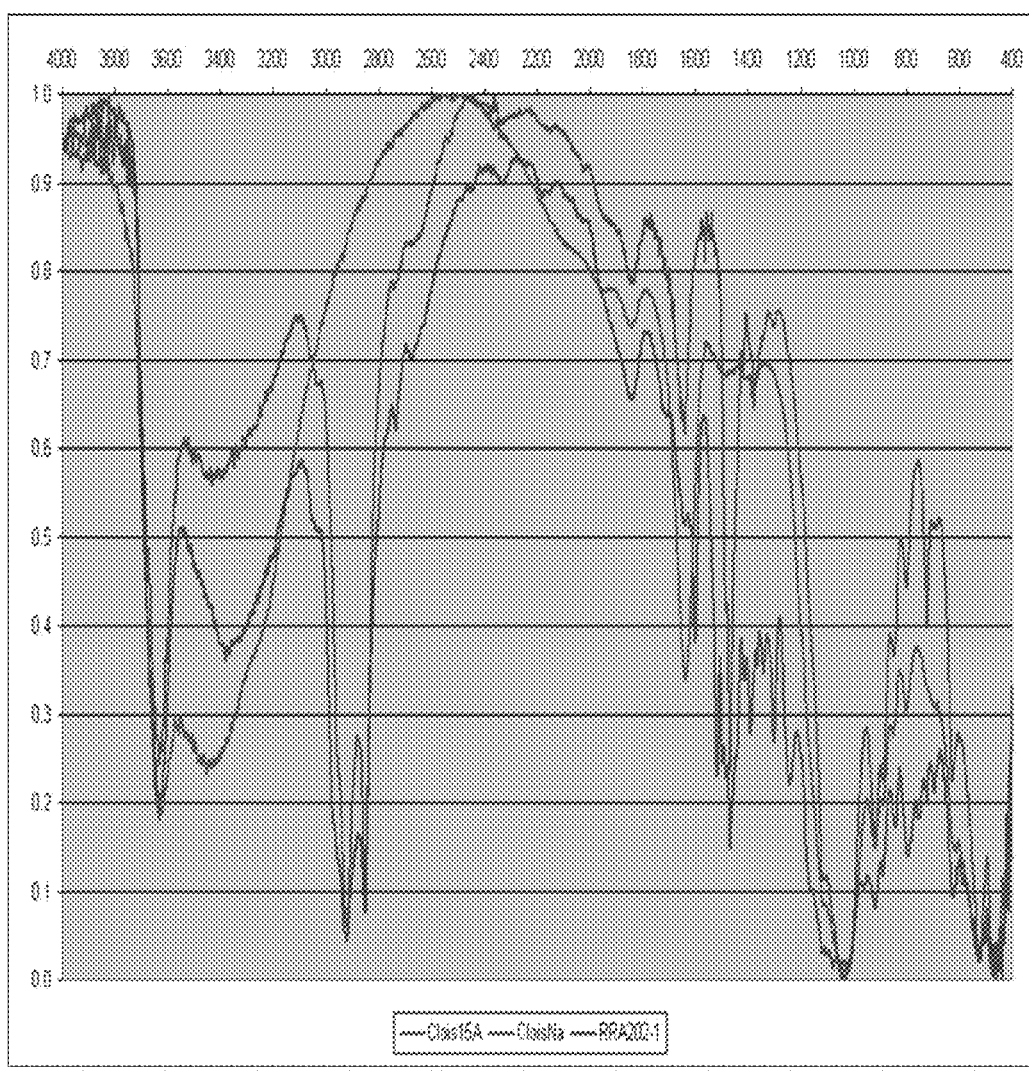
Figure 11B:
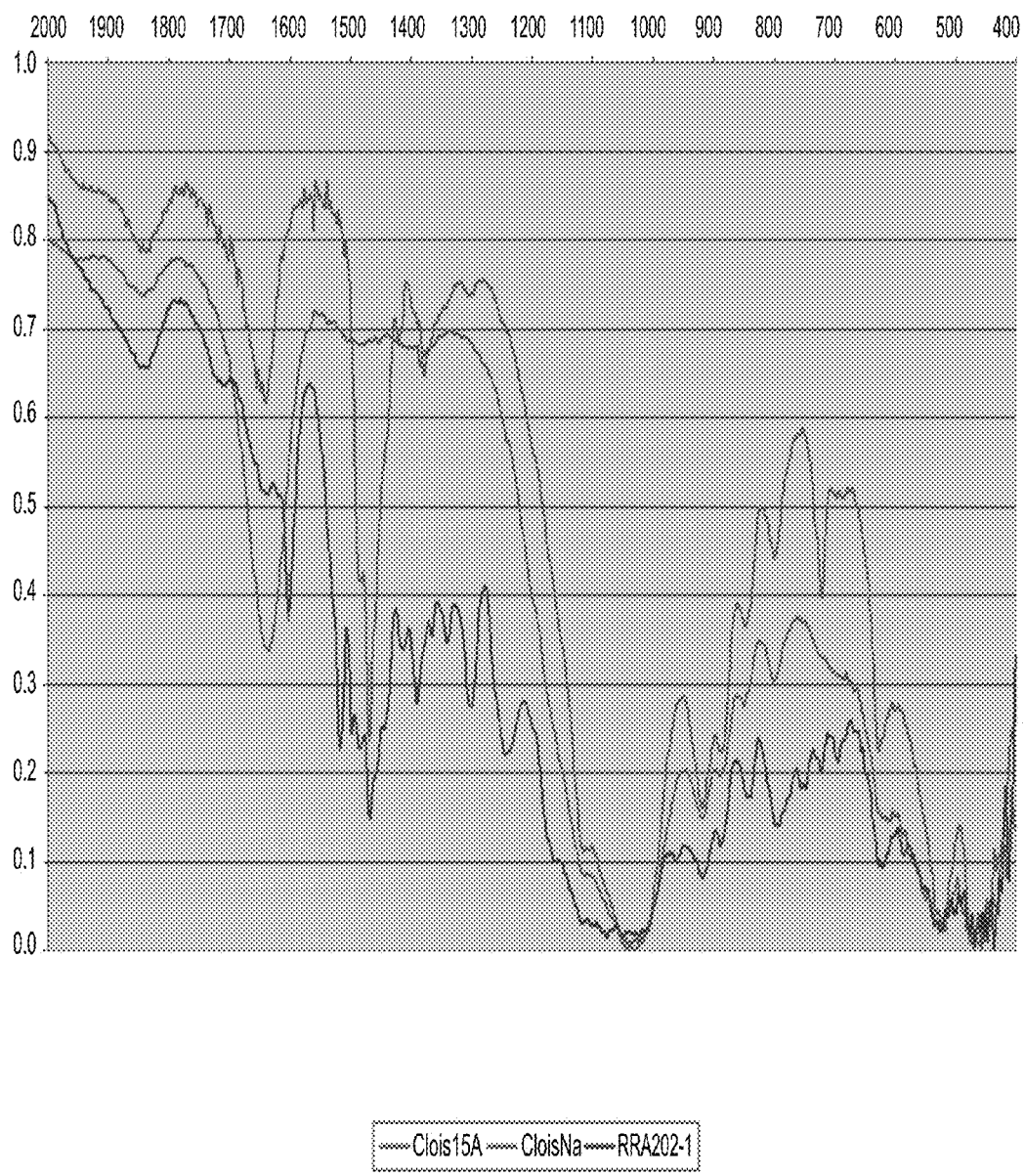
Figure 11C:
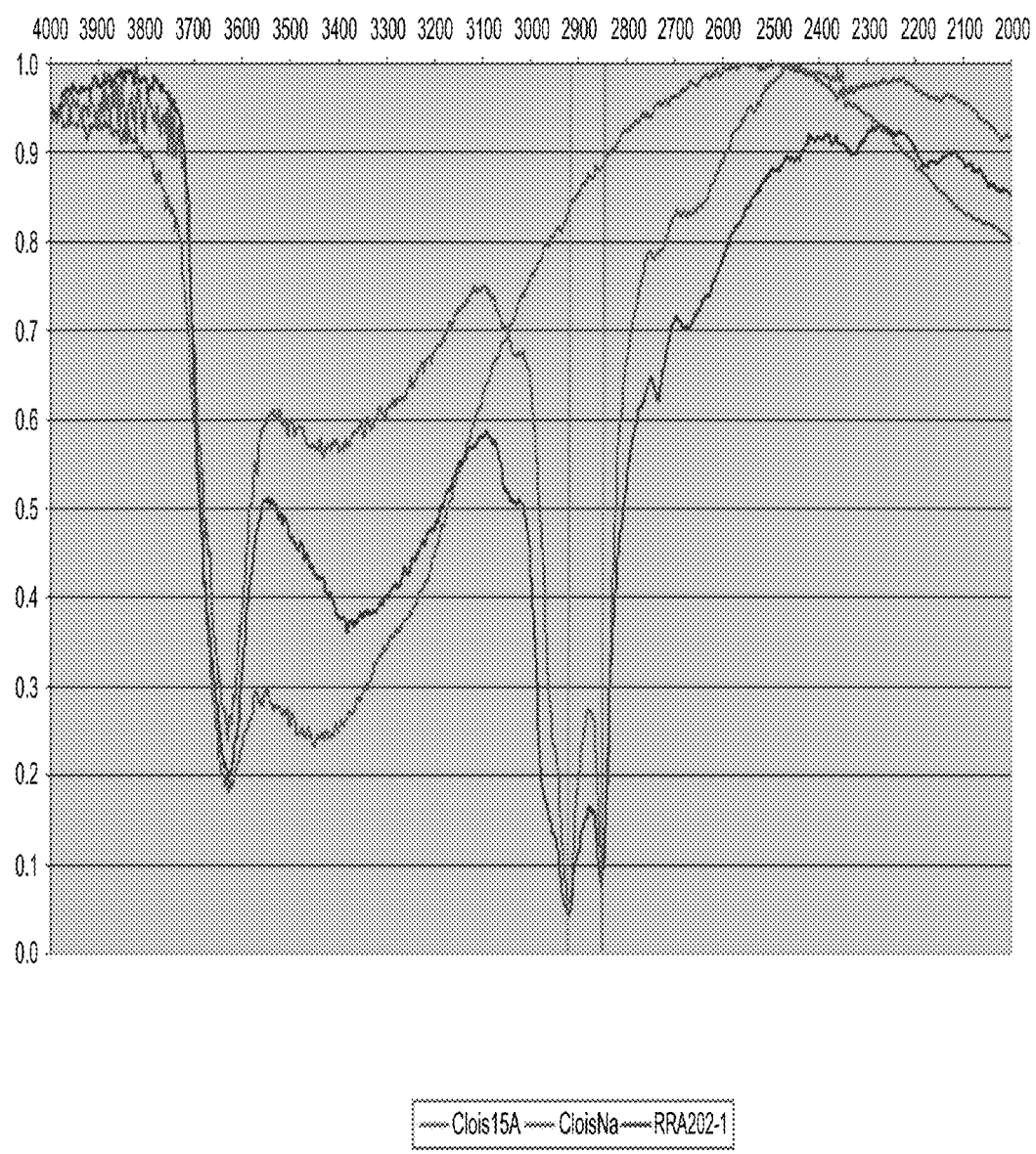
Figure 12:
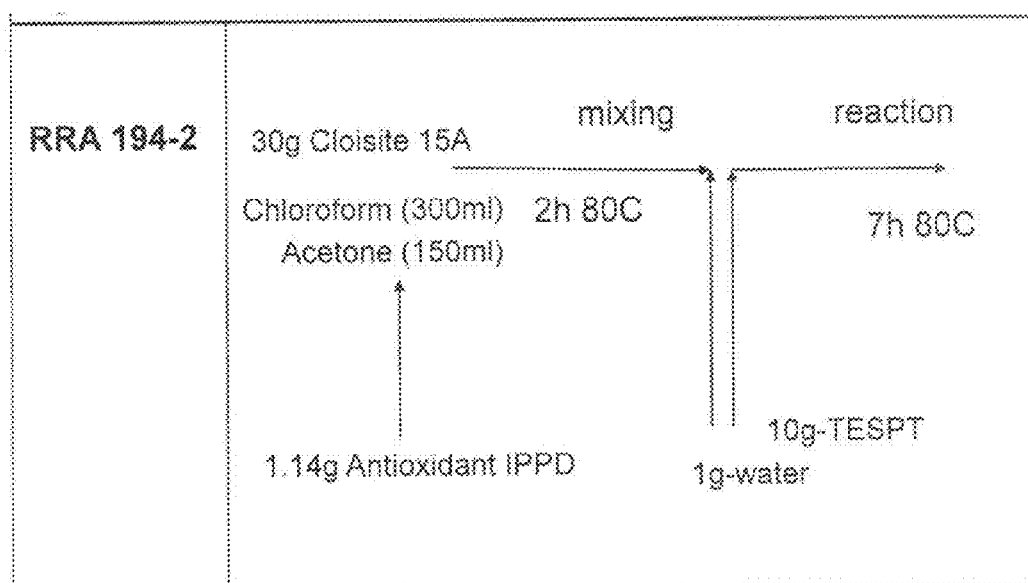
Figure 13:
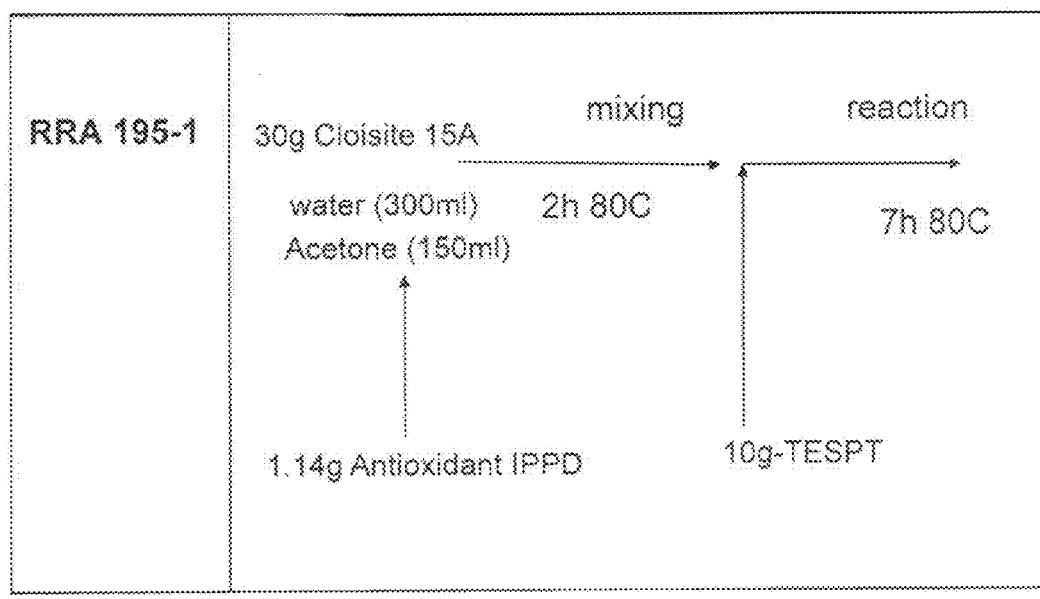
Figure 14:
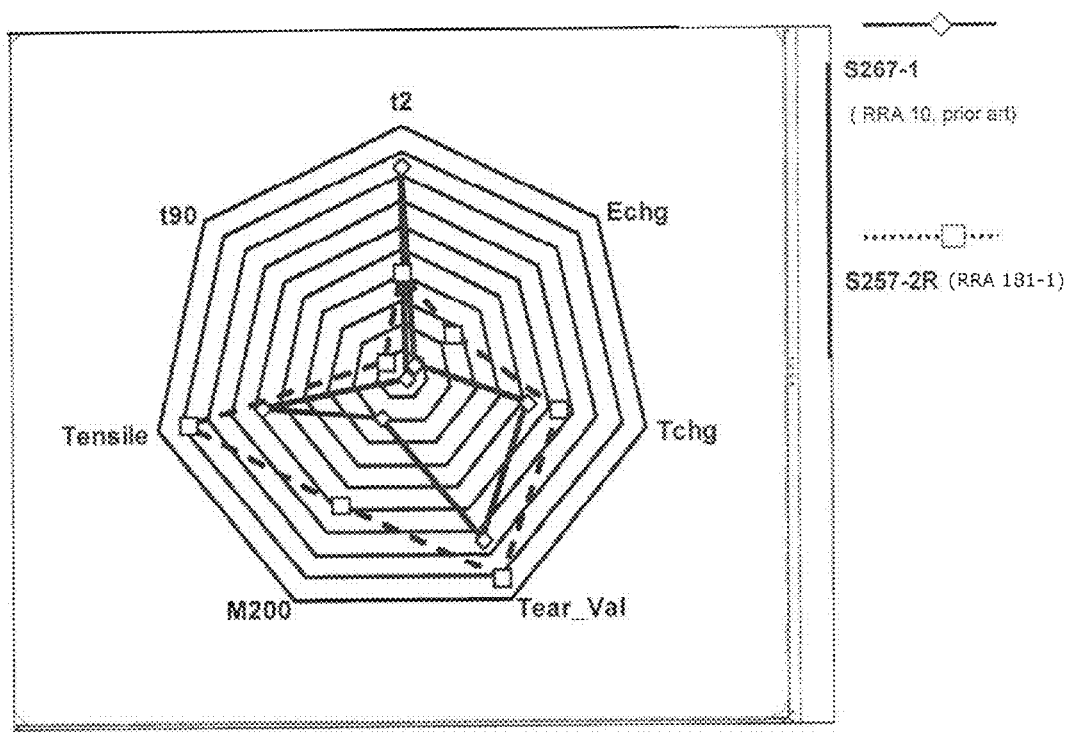
Figure 15:
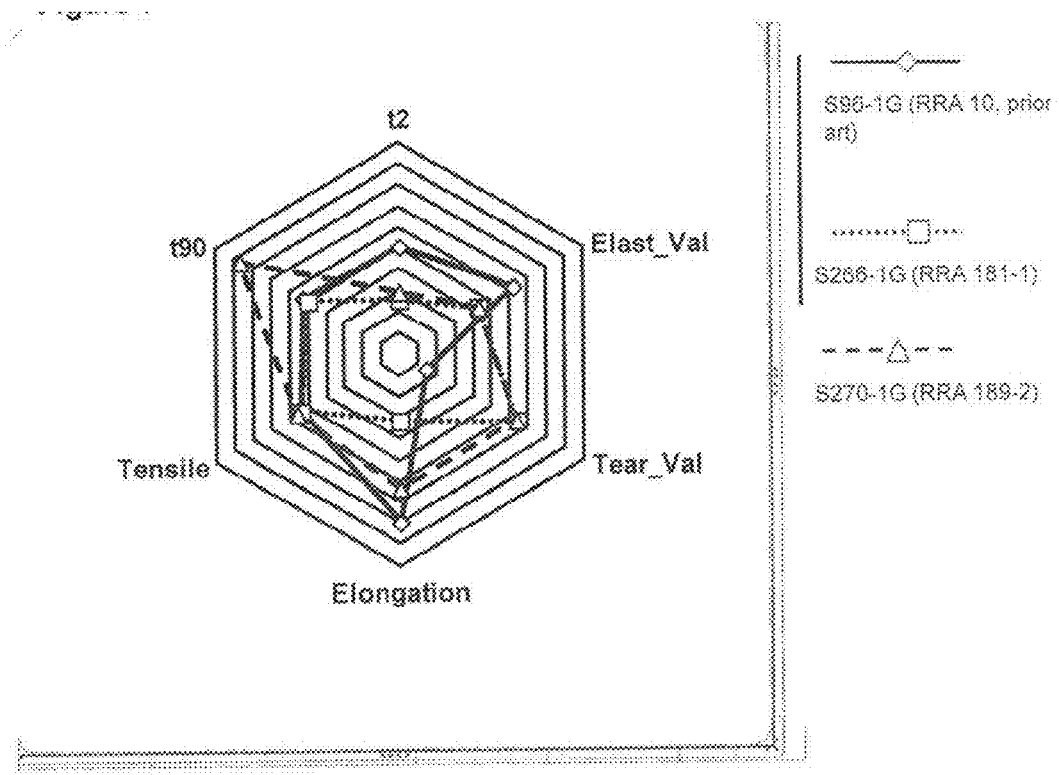
Figure 16:
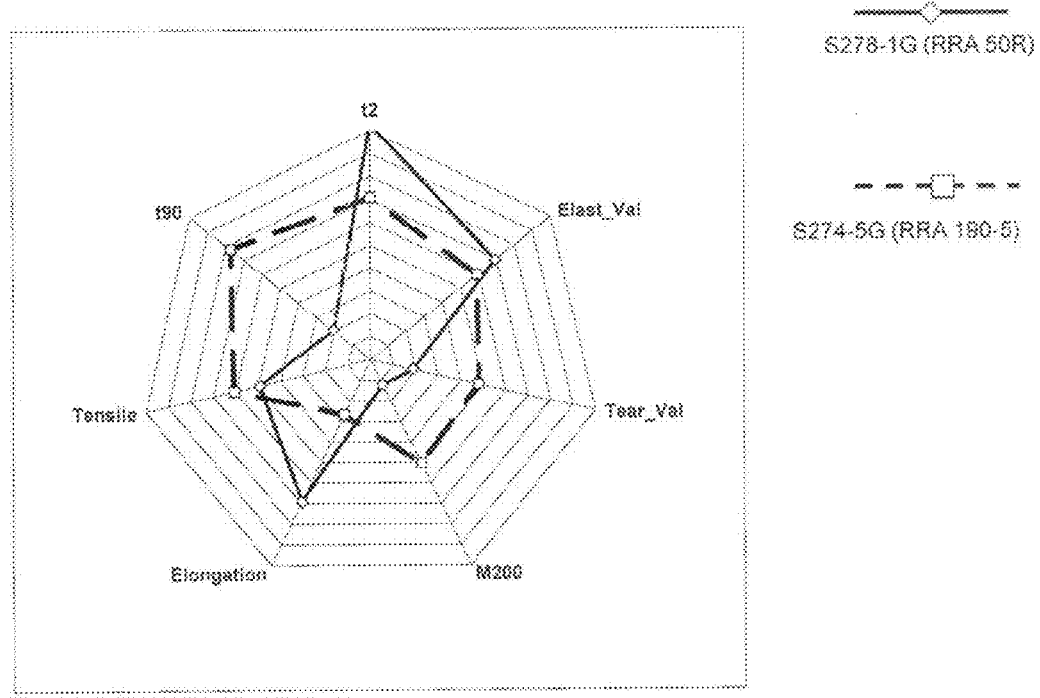
Figure 17:
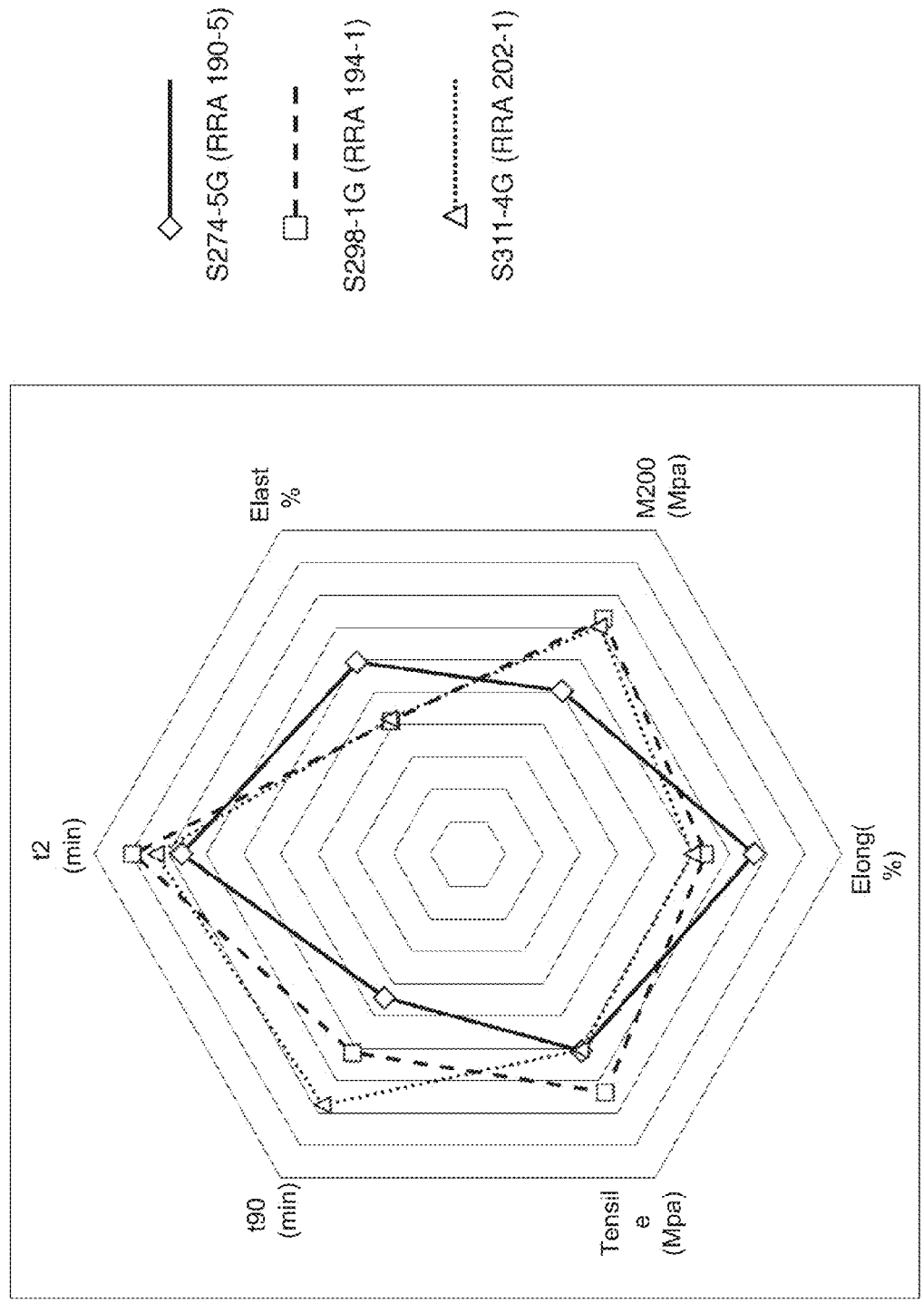
Figure 18:
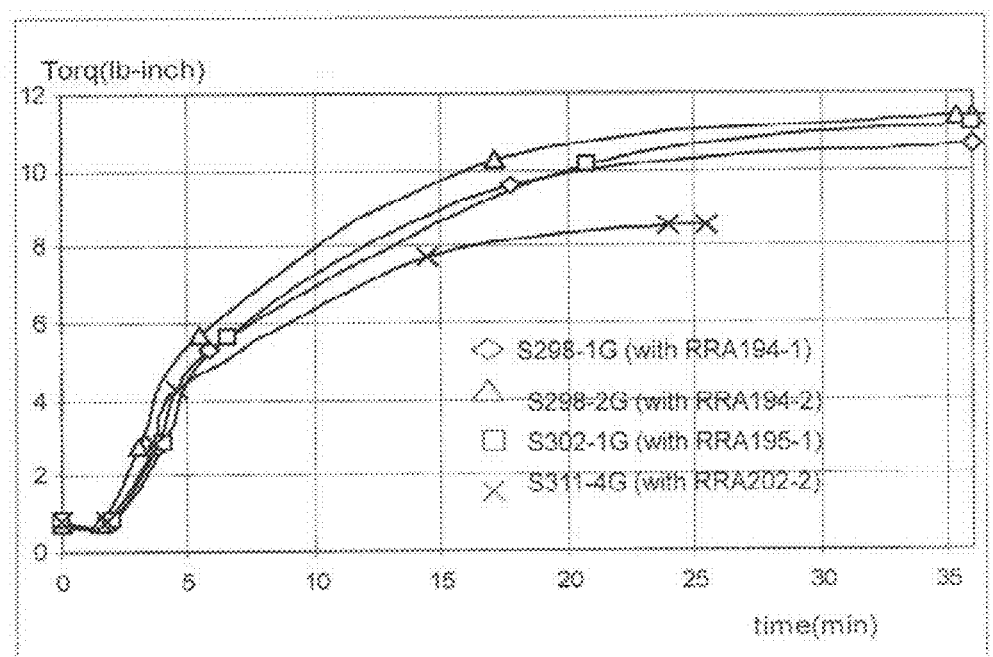
Figure 19:
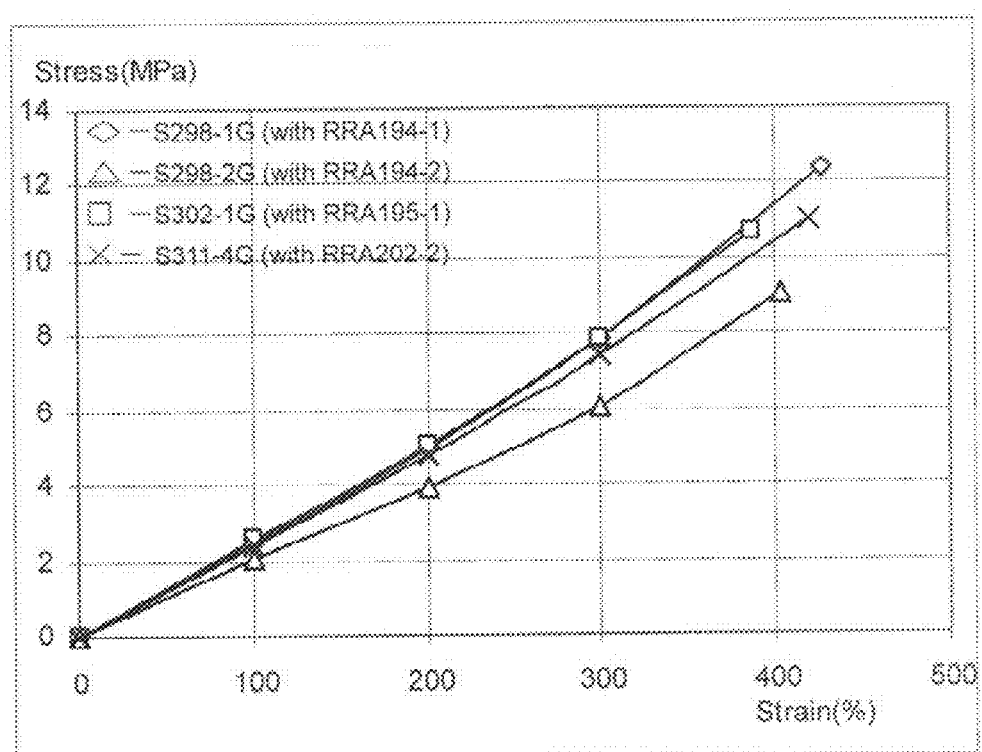

FIG. 1 presents a schematic illustration of an exemplary system for producing modified nanoclays according to some embodiments of the present invention;

FIG. 2 presents a schematic illustration of a drying tray, for drying off the modified nanoclays according to some embodiments of the present invention;

FIG. 3 presents a background art scheme depicting a process for producing a prior art modified (hybrid) nanoclay, named RRA 10, as was previously disclosed (see, for example, http://wwwdotplasticdotorgdotil/nano/nano_02_09_shenkar/PresNanolFeb_09_adamdotppt#2);

FIG. 4 presents a scheme depicting a process of preparing an exemplary modified nanoclay according to some embodiments of the present invention, referred to herein as RRA 181-1, by mixing NC Cloisite 15A and IPPD and thereafter adding Si69 (TESPT);

FIG. 5 presents a scheme depicting a process of preparing an exemplary modified nanoclay according to some embodiments of the present invention, referred to herein as RRA 189-2, by mixing NC Cloisite 15A, DDA and SBS and thereafter adding Si69 (TESPT);

FIG. 6 presents a background art scheme depicting a process of preparing a prior art modified (hybrid) nanoclay, named RRA 50R, which is used with MBS to prepare an elastomeric composite, as was previously disclosed;

FIG. 7 presents a scheme depicting a process of preparing an exemplary modified nanoclay according to some embodiments of the present invention, referred to herein as RRA 190-5, by mixing NC Cloisite 15A, DDA and SBS and thereafter adding Si69 (TESPT);

FIG. 8 presents a scheme depicting a process of preparing an exemplary modified nanoclay according to some embodiments of the present invention, referred to herein as RRA 189-4, by mixing NC Cloisite 15A, DDA and SBS and thereafter adding Si69 (TESPT) without acetic acid;

FIG. 9 presents a scheme depicting a process of preparing an exemplary modified nanoclay according to some embodiments of the present invention, referred to herein as RRA 194-1, by mixing NC Cloisite 15A and IPPD and thereafter adding Si69 (TESPT), while using chloroform as the reaction solvent;

FIG. 10 presents a scheme depicting a process of preparing an exemplary modified nanoclay according to some embodiments of the present invention, referred to herein as RRA 202-1, by mixing NC Cloisite 15A and IPPD and thereafter adding Si69 (TESPT), while using a mixture of isopropyl alcohol (IPA) and water (1:2) as the reaction solvent;

FIGS. 11A-C present comparative IR spectra of Cloisite Na (untreated; green), Cloisite 15A (treated with tallow ammonium; red) and RRA202-1 (blue) (FIG. 11A), with expansion and interpretation of the peaks at a wave length range of 400-2,000 (FIG. 11B) and of 2,000-4,000 (FIG. 11C);

FIG. 12 presents a scheme depicting a process of preparing an exemplary modified nanoclay according to some embodiments of the present invention, referred to herein as RRA 194-2, by mixing NC Cloisite 15A and IPPD and thereafter adding Si69 (TESPT), while using a mixture of chloroform and acetone (2:1) as the reaction solvent;

FIG. 13 presents a scheme depicting a process of preparing an exemplary modified nanoclay according to some embodiments of the present invention, referred to herein as RRA 195-1, by mixing NC Cloisite 15A and IPPD and thereafter adding Si69 (TESPT), while using a mixture of water and acetone (2:1) as the reaction solvent;

FIG. 14 is a graphical presentation of some of the physical characteristics of elastomeric composites made from NC hybrids, comparing an elastomeric composite containing a prior art hybrid RRA 10 (solid line and diamonds), and an elastomeric composite containing the exemplary modified nanoclay according to some embodiments of the present invention, referred to herein as RRA 181-1 (broken line and squares);

FIG. 15 is a graphical presentation of some of the physical characteristics of elastomeric composites made from NC hybrids, comparing an elastomeric composite containing a prior art hybrid RRA 10 (solid line and diamonds), and the exemplary modified nanoclays according to some embodiments of the present invention, referred to herein as RRA 181-1 (dotted line and squares) and 189-2 (broken line and triangles);

FIG. 16 is a graphical presentation of some of the physical characteristics of elastomeric composites made from NC hybrids, comparing an elastomeric composite containing a prior art hybrid RRA 50R (S278-1G, solid line and diamonds), and an elastomeric composite containing an exemplary modified nanoclay according to some embodiments of the present invention, referred to herein as RRA 190-5 (S274-5G, broken line and squares);

FIG. 17 is a graphical presentation of some of the physical characteristics of elastomeric composites made from NC hybrids, comparing elastomeric composites containing RRA 190-5 (diamonds and solid line), RRA 194-1 (S298-1G, squares and broken line) and RRA 202-1 (S331-4G, triangles and dotted line);

FIG. 18 presents comparative plots showing data recorded by a rheometer (Alpha Technologies MDR2000) at 150° C. for exemplary elastomeric composites according to some embodiments of the present invention, made from the nanoclay hybrids RRA 194-1 (S298-1G, diamonds), RRA 194-2 (S298-2G, triangles), and RRA 195-1 (S302-1G, squares) and RRA 202-1 (S311-4G, crosses); and FIG. 19 presented comparative stress-strain curves recorded for exemplary elastomeric composites according to some embodiments of the present invention, made from the nanoclay hybrids RRA 194-1 (S298-1G, diamonds), RRA 194-2 (S298-2G, triangles), and RRA 195-1 (S302-1G, squares) and RRA 202-1 (S311-4G, crosses).

DESCRIPTION OF SPECIFIC EMBODIMENTS
OF THE INVENTION

The present invention, in some embodiments thereof, relates to material science and, more particularly, but not exclusively, to newly modified nanoclays, processes of producing same and elastomeric composites containing same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

In a search for improved and diverse nanoparticles that would be able to impart elastomeric composites containing same with improved performance, the present inventor has envisioned that treating nanoclays with compounds that feature antioxidation activity may result in a dual effect: improving the mechanical and/or rheological properties imparted by the nanoclays to an elastomeric composite containing same, and at the same time, inclusion of an antioxidant for preventing oxidative damage to the elastomeric composite.

To this end, the present inventor has designed and successfully practiced a methodology in which nanoclays are treated with an antioxidant as described herein, and are then further treated with a silyl-containing moiety which may further comprise a sulfur-containing moiety. Using such a methodology enables treating the nanoclays in an organic medium, which allows better distribution of organomodified nanoparticles before treatment with a silyl-containing compound is effected. The introduction of the silyl-containing moiety to the nanoclays is assumed to result in a condensation between the silyl groups and the nanoclays and overall provides nanoclays with improved performance.

Referring now to the drawings, FIGS. 1 and 2 illustrate an exemplary system for preparing modified nanoclays according to some embodiments of the present invention. FIGS. 3-13 present schematic illustrations of chemical syntheses of exemplary modified nanoclays according to some embodiments of the present invention, and of some prior art modified nanoclays. FIGS. 14-19 present comparative graphical presentations of some mechanical and rheological properties of elastomeric composites containing modified nanoclays, demonstrating the superior properties of elastomeric composites according to some embodiments of the present invention, and further demonstrating the effects of the presence or absence of some components during the preparation of the modified nanoclays disclosed herein and/or the preparation of the elastomeric composite. Further comparative data and discussion thereof is provided in the Examples section that follows.

As discussed hereinabove, some currently practiced methodologies utilize organomodified nanoclays as replacement fillers in the rubber and other industries. It has been previously reported that such organomodified nanoclays can be further treated with mercaptosilane (e.g., mercaptosiloxane), and that such nanoclay hybrids have been found to be useful, even at relatively low amounts, in substituting at least part of a portion of carbon black (CB) in elastomer formulas, while essentially retaining the desired properties imparted by the CB at the original levels.

It has now been surprisingly uncovered that treating nanoclays (including already organomodified nanoclays) with compounds that are typically used as antioxidants, and optionally further treating these compounds with a mercaptosilane, such as mercaptosiloxane, results in nanoclay hybrids which are even more advantageous than the previously disclosed hybrids, by for example, imparting higher tear and/or abrasion resistance to elastomeric composites containing same and by reducing ageing of the elastomeric composites. Further manipulations in the process of preparing nanoclay hybrids were also shown to improve performance of the nanoclays, when incorporated in an elastomeric composite.

In general, the elastomeric composites described herein were shown to exhibit improved properties over elastomeric composites containing a similar content of other modified nanoclays (e.g., devoid of an antioxidant). Exemplary improvements are demonstrated in elastic properties such as rebound (Yerzley resilience, tangent), tear resistance and ageing properties. In addition, lighter products are obtained for the same degree of reinforcement, as compared to elastomer composites with prior art components.

For example, it has been demonstrated that elastomeric composites containing the herein disclosed modified nanoclays exhibit very high tear resistance, even higher than 60 N/mm. Currently practiced elastomers, which do not contain NCs, and which are designed to have such high tear resistance, typically contain as much as 50-60 parts CB (carbon black), yet, may still fail to accomplish the desired mechanical properties. In contrast, in elastomeric composites as described herein, replacing up to 35 parts of the CB or about 30 phr silica, with merely about 15-20 parts NCs was found to achieve the same strength.

Herein, the terms "parts" and "phr" are used interchangeably.

Herein throughout and in the art, "phr" refers to parts per hundred of rubber. That is, if Mr represents the mass of an elastomer or of a mixture of monomers for composing an elastomer (a rubber), and Mx represents the mass of a component added to the rubber, then the phr of this component is: 100×Mx/Mr.

Improved ageing properties of the elastomeric composites were demonstrated by reduced change in properties such as hardness, elongation and tear resistance (see, Table 1). Without being bound by any particular theory, it is assumed that in addition to the inherent antioxidation activity of the nanoclays disclosed herein, the treatment of these particles results in enhanced intercalation and hence improved dispersion of the nanoparticles within the elastomeric composite. The dispersed nanoparticles, in a form of platelets is assumed to reduce oxygen penetration into the polymeric network of the elastomeric composite and hence to reduce oxidative degradation.

Herein throughout, an "elastomeric composite" refers to a composition comprising an elastomeric material (e.g., an elastomeric polymer or co-polymer, either before or after vulcanization (e.g., cross-linking)). The elastomeric composite may further comprise additional components, which are typically added to elastomeric polymer or co-polymer mixtures in order to provide elastomers such as rubbers. These include, for example, accelerators, activators, vulcanization agents (typically sulfur), and optionally dispersants, processing aids, plasticizers, fillers, and the like.

Elastomeric composites according to embodiments of the present invention comprise modified nanoclays as disclosed herein. In general, elastomeric composites which comprise nanoparticles such as the modified nanoclays as disclosed herein are also referred to herein and in the art as nanocomposites or elastomeric nanocomposites.

The phrase "elastomeric composite" as described herein refers to both a composition containing all components required for providing an elastomeric composite (e.g., before vulcanization is effected), and the composite product resulting from subjecting such a composition to vulcanization.

In some embodiments, "nanocomposite(s)" and "nanocomposite composition(s)" refer to a polymeric material (including copolymer) having dispersed therein a plurality of individual clay platelets obtained from a layered clay material.

According to an aspect of some embodiments of the present invention, there is provided a composition-of-matter which comprises a modified nanoclay, wherein the modified nanoclay comprises a nanoclay being in association with an amine-containing compound that features an antioxidation activity. The amine-containing compound is also referred to herein as "antioxidant".

The composition-of-matter can comprise a plurality of modified nanoclays, being the same or different, optionally in combination with organomodified nanoclays as described herein (which are not in association with an antioxidant as described herein) and/or with non-modified nanoclays.

According to an aspect of some embodiments of the present invention there is provided a process of preparing a modified nanoclay or a composition-of-matter as disclosed herein.

According to an aspect of some embodiments of the present invention there is provided an elastomeric composite comprising a modified nanoclay or a composition-of-matter as described herein.

The Composition-of-Matter:

The composition-of-matter as disclosed herein comprises one or more modified nanoclays in which a nanoclay is in association with one or more amine-containing compounds featuring an antioxidation activity, as defined herein.

As used herein, the phrase "association" and any grammatical diversion thereof (e.g., "Associated") describe associated via chemical and/or physical interactions. When association is via chemical interactions, the association may be effected, for example, by one or more covalent bonds and/or by one or more non-covalent interactions. Examples of non-covalent interactions include hydrogen bonds, electrostatic interactions, Van der Waals interactions and hydrophobic interactions. When associated via physical interactions, the association may be effected, for example, via absorption, entrapment, and the like.

A modified nanoclay as described herein or a composition-of-matter containing same are also referred to herein as "nanoclay hybrid".

The Nanoclay:

Hereinthroughout, the term "nanoclay" (or NC) refers to particles of a clay material, useful for making nanocomposites, which particles can comprise layers or platelet particles (platelets) obtained from particles comprising layers and, depending on the stage of production, can be in a stacked, intercalated, or exfoliated state.

In some embodiments, the nanoclays comprise montmorillonite.

In some embodiments, the nanoclays are organomodified nanoclays, that is, nanoclays as described herein which have been treated so as to modify the surface thereof by inclusion of organic moieties (e.g., treated with cationic or anionic surfactants, or surface active agents, as described hereinabove).

As used herein, the term "surfactant", which is also referred to herein interchangeably as "a surface-active agent" describes a substance that is capable of modifying the interfacial tension of the substance with which it is associated.

In some embodiments, the nanoclay comprises montmorillonite treated with a cationic surfactant such as an organic ammonium salt or organic amminium salt. Such cationic surfactants typically include primary, secondary or tertiary amines comprising at least one hydrocarbyl chain, preferably a hydrocarbyl that comprises at least 4 carbon atoms, or at least 5, 6, 7, 8, 9, 10, 11, 12, and even more carbon atoms.

As used herein, a "hydrocarbyl" collectively encompasses chemical groups with a backbone chain that is composed of carbon atoms, mainly substituted by hydrogens. Such chemical groups include, for example, alkyls, alkenyls, alkynyls, cycloalkyls, aryls, alkaryl and aralkyls, as these terms are defined herein, and any combination thereof. Some of the hydrogen atoms can be substituted.

Exemplary cationic surfactants include salts of tallow amines.

Tallow is a hard fat consists chiefly of glyceryl esters of oleic, palmitic, and stearic acids (16-18 carbon chains). Tallow amines are tallow based alkyl amines, or fatty amines. Non-limiting examples of tallow based alkyl amines include: Tallow amine (CAS RN: 61790-33-8), Hydrogenated tallow amine (CAS RN: 61788-45-2), Di(hydrogenated tallow)amine (CAS RN: 61789-79-5), Dihydrogenated tallow methyl amine (CAS RN: 61788-63-4), and N-(Tallow alkyl)dipropylenetriamine (CAS RN: 61791-57-9). Additional examples include, but are not limited to, hydrogenated tallow dimethyl benzyl amine, dihydrogenated tallow dimethylamine, hydrogenated tallow dimethylamine, N-2-ethylhexyl tallow amine, and methyl tallow, bis-2-hydroxyethyl.

Nanoclays modified by tallow amines or any other surface active agent can be modified by one or more of the salts described herein.

Exemplary commercially available organomodified nanoclays include, but are not limited to, Cloisite 10A, 15A, 20A, 25A and 30B of Southern Clays; Nanomer 1.31 ps, 1.28E and 1.34 TCN of Nanocor. In general, the commercially available organomodified NCs are montmorillonites in which sodium ions are exchanged with ammonium or amminium ions.

In embodiments where the nanoclay comprises organomodified nanoclays, it may include one type of organomodified nanoclays or two or more types of differently modified nanoclays or a mixture of organomodified and non-modified nanoclays.

It is to be noted that when modified nanoclays, such as organomodified nanoclays, are utilized as the nanoclays of which the composition-of-matter as described herein comprises, these organomodified nanoclays are further modified by an amine-containing compound as described herein and hence are in association with both a surface active agent, as described herein (e.g., derived from a tallow ammonium salt), and with an amine-containing compounds as described herein. Embodiments of the present invention also encompass organomodified nanoclays is which the surfactant is an amine-containing compound as described herein. Such organomodified nanoclays, according to some embodiments of the present invention, are further treated with an amine-containing compound as described herein.

The Amine-Containing Compound:

Herein, an "amine-containing compound featuring an antioxidation activity" is also referred to as "antioxidant".

As known in the art, and is used herein, an antioxidant is a substance which is added, typically in small quantities, to formulations or products which are susceptible to oxidation, so as to inhibit or slow oxidative processes, while being oxidized by itself or otherwise interacting with the oxidative species.

In the context of elastomeric compositions or composites, antioxidants are typically used for inhibiting or slowing oxidative degradation of the polymeric network. Oxidative degradation of polymers often occurs as a result of free radicals, and antioxidants of polymeric materials are often fee radical scavengers. Such antioxidants are often called antiozonates. Such antioxidants typically act by donating an electron or hydrogen atom to the formed radical, to thereby inhibit the free-radical degradation.

Herein, an antioxidant encompasses any anti-oxidant that is suitable for use in the elastomeric formulation/rubber fields.

In some embodiments, the antioxidant is a compound containing at least one amine group, as defined herein, and preferably two or more amine groups. Without being bound by any particular theory, it is assumed that such amine-containing compounds exhibit a dual effect: binding to the nanoclay (e.g., via one or more amine groups), and acting as an antioxidant (e.g., via one or more free, non-bound amine groups).

Binding to the nanoclay via more than one amine group in an amine-containing compound as described herein may improve the strength of the elastomeric composite containing the composition-of-matter.

Antioxidants containing one or more amine groups include, but are not limited to, compounds comprising stearically hindered amines, such as, for example, p-phenylene diamines (p-PDA), ethylene diurea derivatives, substituted dihydroquinolines, alkylated diphenyl amines, substituted phenolic compounds having one or more bulky substituents, as defined herein, diphenylamine-acetone reaction products, tris(nonyl phenyl) phosphates or amine compounds substituted by one or more alkyls and/or one or more bulky substituents, as defined herein. Other amine-containing compounds that exhibit antioxidation activity, preferably as free radical scavengers or as antiozonates in the rubber field, are contemplated.

In some embodiments, the amine-containing compound is a para-phenylenediamine (p-PDA). In some embodiments, the p-PDA is a N,N'-disubstituted-p-phenylenediamine, including symmetrical N,N'-dialkyl-p-phenylenediamines and N,N'-diaryl-p-phenylenediamines, and non-symmetrical N alkyl, N'-aryl-p-phenylenediamines.

Non-limiting examples of p-PDAs which are suitable for use in the context of the present embodiments are depicted in Scheme 1 below.

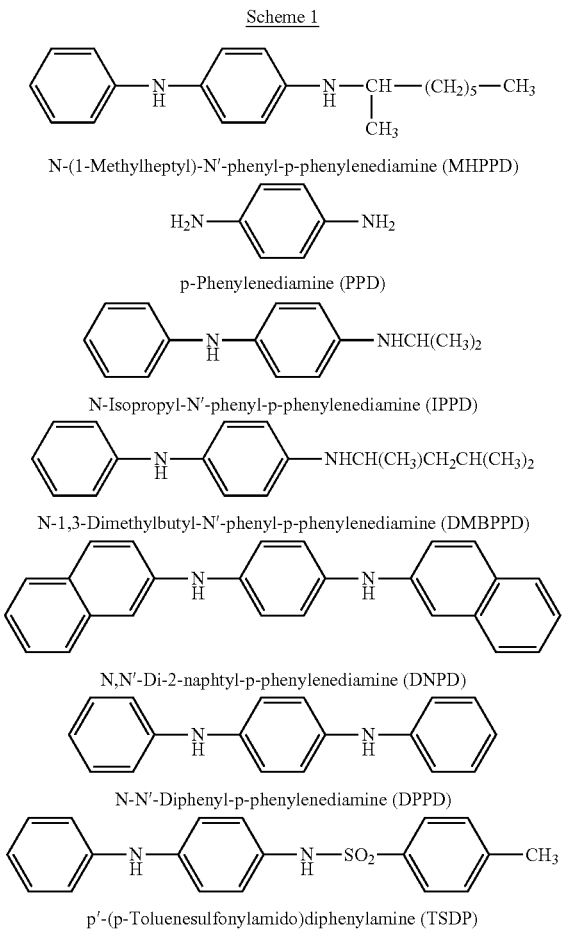

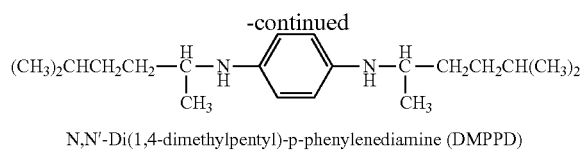

N,N'-Di(1,4-dimethylpentyl)-p-phenylenediamine (DMPPD)

Herein, ethylene diurea derivatives are compounds which can be collectively represented by the general formula:

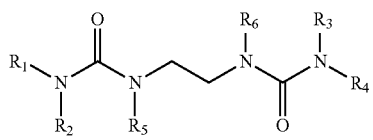

wherein:

$R_1$, $R_2$, $R_3$ and $R_4$, and/or $R_5$ and $R_6$ are each independently selected from the group consisting of hydrogen, alkyl, alkenyl, alkynyl, cycloakyl, aryl, alkaryl, aralkyl, alkenyl, alkynyl, each being optionally substituted as defined herein, and optionally and preferably, at least one of $R_1$, $R_2$, $R_3$ and $R_4$, and/or $R_5$ and $R_6$ is a bulky substituent, as described herein.

An exemplary bulky substituent in the context of these embodiments is 3,5-dihydrocarbyl-4-hydroxyphenylalkyl group.

In some embodiments, the antioxidant is a p-PDA, such as IPPD or DMBPPD (also referred to as 6PPP).

In some embodiments, the antioxidant is an amine substituted by one or more alkyl and/or other bulky substituents. Such antioxidants include, for example, tertiary amines such as triethylamine or any other amine substituted by 3 hydrocarbyl groups, as defined herein, whereby each hydrocarbyl group can independently be of 2-24 carbon atoms, such as, N,N-dimethyldodecan-1-amine (DDA; CAS number: 83855-88-1); and primary amines such as, but not limited to, dodecylamine.

As used herein, the phrase "bulky", in the context of a substituent, describes a group that occupies a large volume. A bulkiness of a group is determined by the number and size of the atoms composing the group, by their arrangement, and by the interactions between the atoms (e.g., bond lengths, repulsive interactions). Typically, lower, linear alkyls are less bulky than branched alkyls; bicyclic molecules are more bulky than cycloalkyls, etc.

Exemplary bulky groups include, but are not limited to, branched alkyls such as tert-butyl, isobutyl, isopropyl and tert-hexyl, as well as substituted alkyls such as triphenylmethane (trityl) and cumaryl. Additional bulky groups include substituted or unsubstituted aryl, alkaryl, aralkyl, heteroaryl, cycloalkyl and/or heteroalicyclic, as defined herein, having at least 6 carbon atoms.

In some embodiments, a bulky substituent comprises more than 4 atoms, more than 6 atoms, preferably more than 8 atoms, or more than 12 atoms.

The term "amine" describes a —NR'R" group, with R' and R" being hydrogen, alkyl, cycloalkyl or aryl, as defined herein. Other substituents are also contemplated. The term "amine" also encompasses an amine group which is not an end group, such as, for example, a —NR'— group, in which R' is as defined herein.

The term "alkyl", as used herein, describes a saturated aliphatic hydrocarbon including straight chain and branched chain groups. In some embodiments, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. In some embodiments, the alkyl is a lower alkyl having 1 to 4 carbon atoms. The alkyl group may be substituted or unsubstituted, as indicated herein.

The term "alkenyl", as used herein, describes an alkyl, as defined herein, which contains a carbon-to-carbon double bond.

The term "alkynyl", as used herein, describes an alkyl, as defined herein, which contains carbon-to-carbon triple bond.

The term "cycloalkyl" describes an all-carbon monocyclic or fused ring (i.e., rings which share an adjacent pair of carbon atoms) group where one or more of the rings does not have a completely conjugated pi-electron system. The cycloalkyl group may be substituted or unsubstituted, as indicated herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted, as indicated herein.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furane, thiophene, imidazole, oxazole, thiazole, pyrazole, pyridine, pyrimidine, quinoline, isoquinoline and purine.

The term "heteroalicyclic" or "heterocyclyl" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino and the like.

The term "alkaryl" describes an alkyl substituted by one or more aryls. Examples include benzyl, cumaryl, trityl, and the like.

The term "aralkyl", as used herein, describes an aryl substituted by one or more alkyls. Examples include toluene, styrene, and the like.

Each of the alkyl, alkenyl, alkynyl, cycloalkyl, aryl, alkaryl, aralkyl, heteroalicycic and heteroaryl groups described herein may be substituted by one or more substituents, whereby each substituent group can independently be, for example, halogen, alkyl, alkoxy, cycloalkyl, alkoxy, nitro, amine, hydroxyl, thiol, thioalkoxy, thiohydroxy, carboxy, amide, aryl and aryloxy, depending on the substituted group and its position in the molecule. Additional substituents are also contemplated.

The term "halide", "halogen" or "halo" describes fluorine, chlorine, bromine or iodine.

The term "haloalkyl" describes an alkyl group as defined herein, further substituted by one or more halide(s).

The term "hydroxyl" or "hydroxy" describes a —OH group.

The term "thiohydroxy" or "thiol" describes a —SH group.

The term "thioalkoxy" describes both an —S-alkyl group, and a —S-cycloalkyl group, as defined herein.

The term "thioaryloxy" describes both an —S-aryl and a —S-heteroaryl group, as defined herein.

The term "alkoxy" describes both an —O-alkyl and an —O-cycloalkyl group, as defined herein.

The term "aryloxy" describes an —O-aryl, as defined herein.

The term "carboxy" or "carboxylate" describes a —C(=O)—OR' group, where R' is hydrogen, alkyl, cycloalkyl, alkenyl, aryl, heteroaryl (bonded through a ring carbon) or heteroalicyclic (bonded through a ring carbon) as defined herein.

The term "carbonyl" describes a —C(=O)—R' group, where R' is as defined hereinabove.

The above-terms also encompass thio-derivatives thereof (thiocarboxy and thiocarbonyl).

The term "thiocarbonyl" describes a —C(=S)—R' group, where R' is as defined hereinabove.

A "thiocarboxy" group describes a —C(=S)—OR' group, where R' is as defined herein.

A "sulfinyl" group describes an —S(=O)—R' group, where R' is as defined herein.

A "sulfonyl" group describes an —S(=O)$_2$—R' group, where Rx is as defined herein.

A "carbamyl" group describes an —OC(=O)—NR'R" group, where R' is as defined herein and R" is as defined for R'.

A "nitro" group refers to a —NO$_2$ group.

A "cyano" or "nitrile" group refers to a —C≡N group.

As used herein, the term "azide" refers to a —N$_3$ group.

The term "sulfonamide" refers to a —S(=O)$_2$—NR'R" group, with R' and R" as defined herein.

The term "phosphonyl" describes an —O—P(=O)(OR')$_2$ group, with R' as defined hereinabove.

The term "phosphinyl" describes a —PR'R" group, with R' and R" as defined hereinabove.

Additional Ingredients:

In some embodiments, any of the compositions-of-matter described herein comprises additional components, being either in association with the nanoclay or with the moieties being in association with the nanoclay, as described herein.

In some embodiments, the composition-of-matter further comprises a silyl-containing compound. In some embodiments, the silyl-containing compound is in association with the nanoclay, as described herein.

As used herein, a "silyl-containing compound" is a compound which comprises one or more Si atoms, whereby the Si atom is substituted by one or more organic substituents.

In some embodiments, the silyl containing compound is a siloxane-containing compound, comprising a Si atom substituted by one or more hydroxy or alkoxy groups, as defined herein. Such compounds may react, via condensation, with free hydroxy groups on the surface of the nanoclay.

In some embodiments, the silyl-containing compound or the siloxane-containing compound comprises a sulfur-containing moiety, such as, but not limited to, a moiety that comprises a thiol group, as a substituted of the Si atom. An exemplary such substituent is a thioalkyl, such as, for example, an alkyl, as described herein (e.g., ethyl, propyl, butyl, etc.) substituted by one or more thiol groups or sulfide groups.

Silyl-containing compounds or siloxane-containing compounds which comprise a sulfur-containing substituent are also referred to herein as mercaptosilanes or mercaptosiloxanes. Such compounds are advantageous since the sulfur moiety may participate in the vulcanization of an elastomeric composition containing the composition-of-matter.

In some embodiments, the silyl-containing compound comprises one or more siloxanes (e.g., triorthosilicate) substituted by one or more alkyl sulfides or thioalkyls.

An exemplary silyl-containing compound is bis(triethoxysilylpropyl)tetrasulfane (TESPT).

In some embodiments, additional components are added during modification of a nanoclay and hence are included in the composition-of-matter as described herein.

In some embodiments, the composition-of-matter further comprises an accelerator.

Exemplary accelerators which are suitable for use in the context of embodiments of the present invention include, but are not limited to, TBBS, MBS, CBS, MBT, TMDM, and any other accelerator that is usable in the elastomer industry.

In some embodiments, silica is added to the composition-of-matter as described herein. Compositions-of-matter comprising silica provide improved reinforcement when added to elastomeric composites, as discussed and demonstrated hereinafter.

The Process:

According to some embodiments of the present invention, a process of preparing a composition-of-matter as described herein is generally effected by reacting (e.g., by mixing) a nanoclay (either non-treated or an organomodified nanoclay, as described herein) and an amine-containing compound (an antioxidant) as described herein, in a solvent.

When the modified nanoclay is further in association with a silyl-containing compound, as described herein, the process is generally effected by reacting (e.g., by mixing) the nanoclay (either non-treated or an organomodified nanoclay, as described herein), the amine-containing compound and the silyl-containing compound.

In some embodiments, the nanoclay used in the process as described herein is an organomodified nanoclay, as described herein, which is further treated with an amine-containing compound as described herein.

An organomodified nanoclay can be a commercially available nanoclay or be synthetically prepared and then used in the process as described herein.

In some embodiments, the nanoclay and the amine-containing compound are first reacted and then the silyl-containing compound is added and the reaction is continued.

In cases where the reaction is performed in an organic solvent, the process further comprises adding water, prior to, concomitant with, or subsequent to the addition of the silyl-containing compound. Without being bound by any particular theory, it is assumed that the addition of water facilitates generation of free hydroxy groups within the silyl-containing compound, which can then react with free hydroxy groups on the nanoclay surface.

Additional ingredients, if present, can also be added, either concomitant with or subsequent to, mixing the nanoclay and the antioxidant.

For example, an accelerator, as defined herein, can be added to a mixture of the nanoclay and the antioxidant, and then, upon reacting this mixture (by, e.g., mixing) a silyl-containing compound is added and reaction is continued.

In another example, silica is added after mixing a nanoclay and an antioxidant, and optionally an accelerator, and after further mixing, the silyl-containing compound is added. In some embodiments, such mixing is performed for about 10 hours, at elevated temperature (e.g., 80-100° C.).

In some embodiments, the silyl-containing compound is added with water and/or an acid (e.g., acetic acid). When acid is added, it is such that generates pH of about 3 in the reaction mixture. Exemplary acids include Ufacid and acetic acid (glacial). It is noted, however, that preferably, an acid is not added.

In some embodiments, reacting any of the components described herein, and in any combination thereof (e.g., by mixing a reaction mixture containing these components or combination thereof) is effected at elevated temperature. In some embodiments, the temperature is determined by the boiling temperature of the solvent. In some embodiments, reacting is effect at a temperature that ranges from 50° C. to 150° C., or from 50° C. to 100° C., or from 60° C. to 100° C.

In some embodiments, the reacting (e.g., by mixing) is effected for a time period that ranges from 2 hours to 30 hours, or from 2 hours to 20 hours, or from 2 hours to 15 hours, or from 5 hours to 10 hours. Higher reaction times are also contemplated and may depend on the presence and nature of additional components.

If ingredients are added to the reaction mixture after initially mixing the nanoclay and the antioxidant (and optionally an accelerator), the initial mixing can be effected for 1-3 hours (e.g., 2 hours), and then, upon adding further reactants, for additional 2-10 hours (e.g., 7 hours), depending on the nature of the additional component.

Other conditions (e.g., time and temperature of mixing) are also contemplated.

Mixing can be effected using any methods known in the art of synthetic chemistry. An exemplary system is depicted in FIG. 1.

Once the reaction is stopped by e.g., cooling, the obtained reaction mixture can be dried, to thereby obtain the composition-of-matter.

As discussed in detail in the Examples section that follows, the solvent in which the process is effected can be any of an organic solvent and a mixture of organic solvent and water.

Suitable organic solvents include, but are not limited to, polar solvents such as acetone, chloroform, alcohols, and the like.

In some embodiments, the organic solvent is a non-flammable solvent such as, but not limited to, isopropyl alcohol and/or chloroform.

In some embodiments, when a mixture of an organic solvent as described herein and water is used, the organic solvent:water ratio can range from 5:1 to 1:5, or from 3:1 to 1:3 or from 2:1 to 1:2, including any intermediate ratios between these values, or is 1:1.

Without being bound by any particular theory, it is assumed that treating nanoclays, including organomodified nanoclays, in an organic solvent, renders modification of the nanoclays more efficient as it enables efficient dispersion of particles in the solvent, thus rendering the surface thereof accessible to further association with the antioxidant and any of the other components within the composition-of-matter.

According to an aspect of some embodiments of the present invention, there is provided a composition-of-matter, prepared by a process as described herein.

Elastomeric Composites:

The elastomeric composites disclosed herein generally comprise an elastomer (e.g., a polymer or a copolymer, in its vulcanized form, or as a mixture of monomers before vulcanization) and any of the compositions-of-matter described herein.

The elastomeric composites can further comprise additional components that are commonly used in elastomeric formulations, such as a vulcanization agent (e.g., sulfur), activators (e.g., zinc oxide, stearic acid), accelerators (e.g., MBS, TBBS, and processing aid agents such as dispersants, retarders, processing oils, plasticizers, and the like.

As discussed herein, elastomeric composites as described herein are advantageously characterized by mechanical and/or rheological properties which are at least similar if not superior to corresponding elastomeric composites in which prior art nanoclays are used, while including a reduced or even nullified amount of a filler such as carbon black.

In some embodiments, the amount of the modified nanoclays or of a composition-of-matter containing same ranges from 5 phr to 50 phr, preferably from 5 to 30 phr, or from 5 to 25 phr, or from 7.5 to 25 phr, or from 10 to 25 phr, or from 7.5 to 15 phr, or from 10 to 15 phr. Any value therebetween is contemplated.

In some embodiments, the elastomeric composite is devoid of a filler such as carbon black.

In some embodiments, the elastomeric composite comprises silica as a filler. In some of these embodiments, the silica is included in the composition-of-matter as described herein. In some embodiments, the elastomeric composite is devoid of additional silica.

By "devoid of" it is meant that the amount of the filler is less than 1 weight percents or one phr, less than 0.1 weight percents or phr, and even less than 0.01 weight percents or phr.

In some embodiments, an elastomeric composite as described herein comprises a filler such as carbon black, yet, an amount of the filler is lower than acceptable by at least 20%, for example, by 20%, by 30%, by 40% and even by 50% or more.

In some embodiments, an elastomeric composite that comprises a lower amount of a filler as described herein exhibits substantially the same performance as an elastomeric composite with an acceptable filler content.

That is, for example, considering an averaged acceptable CB content of 30 phr, an elastomeric composite as described herein exhibits the same performance when comprising 30 phr, 15 phr and even 10 phr or lower amount of CB.

In another example, if an elastomeric composite that is designed to have a certain tear resistance comprises 50 phr CB, when such an elastic composite comprises a composition-of-matter as described herein, it exhibits the same tear resistance, yet comprises 40 phr, or 30 phr, or 20 phr or even a lower amount of CB.

In exemplary embodiments, elastomeric composites as described herein, which comprise SBR as the elastomer, and which are devoid of CB or any other filler that is added to the elastomeric compositions, exhibit one or more of the following exemplary mechanical properties:

Shore A hardness higher than 50;
Tensile strength higher than 10 MPa;
Elongation of at least 400%, or at least 450%;
Modulus at 200% elongation of at least 3 MPa, or at least 3.5 MPa;
Tear resistance of at least 30 N/mm; and
Elasticity (Yerzley) of at least 75%.

In exemplary embodiments, elastomeric composites as described hereinabove in which silica is added to the composition-of-matter, exhibit one or more of the following exemplary mechanical properties:

Shore A hardness higher than 50;
Tensile strength higher than 11 MPa;
Elongation of at least 400%;
Modulus at 200% elongation of at least 4 MPa;
Tear resistance of at least 40 N/mm; and
Elasticity (Yerzley) of at least 75%.

In further exemplary embodiments, elastomeric composites as described hereinabove, which further include CB, in an amount of 15 phr, exhibit one or more of the following exemplary mechanical properties:

Shore A hardness of about, or higher than, 70;
Tensile strength higher than 20 MPa;

Elongation of at least 400%;

Modulus at 200% elongation of about, or higher than, 10 MPa;

Tear resistance of at least 50 N/mm, or at least 55 N/mm, or at least 60 N/mm; and Elasticity (Yerzley) of at least 75%.

In some embodiments, the elastomeric composite comprises SBR as the elastomer.

Other suitable elastomers include, but are not limited to, an isoprene elastomer, a polybutadiene elastomer, a butadiene acrylonitrile elastomer, an EPDM elastomer, a natural rubber, an ethylene norbornene elastomer, and any combination thereof. Any other elastomer is also contemplated.

The performance of elastomeric composites comprising such elastomers and a composition-of-matter as described herein, can be improved similarly to the above-described improvement of an SBR elastomer.

Any of the elastomeric composites as described herein can be prepared by methods known in the art of elastomers, including, for example, plate molding and extrusion (e.g., with steam).

Any of the elastomeric composites as described herein can be used in the manufacture of various articles-of-manufacturing that require elastomers, and particularly elastomers having high tear resistance, elasticity and/or reduced ageing. These include, for example, tires and other vehicle components, containers, panels, boards, pallets, pots, mats and any other rubber-based articles.

It is expected that during the life of a patent maturing from this application many relevant elastomers will be developed and the scope of the term elastomer is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

MATERIALS AND EXPERIMENTAL METHODS

List of Materials:

| Type | Trade Name/ Abbreviation | Chemical composition | Exemplary provider |
|---|---|---|---|
| Elastomers | Synpol 1502 | cold emulsion Styrene Butadiene Rubber Styrene 23% ML(1 + 4)100-46* | Ameripol Synpol |
| | Keltan 512 | regular Ethylene Propylene Terpolymer ENB cont-4.5% ML{1 + 4)100C-55 | DSM |

| Type | Trade Name/Abbreviation | Chemical composition | Exemplary provider |
|---|---|---|---|
| | Krynac 50.75 | cold emulsion Butadiene Acrylonitrile rubber Acetonitrile (ACN) content 48% ML{1 + 4}100-75 | Bayer |
| | SMR 10 | Natural Rubber, dirt content 0.1% | Standard Malaysian Rubber |
| | BR 1220 | Polybutadiene Rubber ML(1 + 4)100-45 | Nippon Zeon |
| | ENB | ethylene norbornene | |
| Nanoclays | Cloisite 15A | Montmorillonite (MMT) treated with dimethyl hydrogenated tallow ammonium | Southern Clays |
| | Cloisite 30B | MMT treated with methyldihyroxethyl hydrogenated tallow ammonium | Southern Clays |
| Mercaptosilane | Si69 | TESPT bis(triethoxysilylpropyl) tetrasulfane | Degussa |
| amine-containing antioxidants | TEA | Triethanolamine | |
| | IPPD | N-isopropyL-N'-phenyl-paraphenylene diamine | |
| | DDA | Dodecylamine | |
| Accelerators | TBBS (Santocure) | N-tertbutyl benzothiazyl sulphenamide | Flexsys |
| | MBT (Perkacit) | mercaptobenzothiazol | Flexsys |
| | TMTD (Perkacit) | tetramethylthiuram disulphide | Flexsys |
| | CBS (Santocure) | N-cyclohexyl-2-benzothiazyl sulphenamide | Flexsys |
| | MBS (Santocure) | 2-(4-morpholinyl-mercapto)-benzothiazole | Flexsys |
| | DPG (Perkacit) | diphenyl guanidine | Flexsys |
| | TMTM (Perkacit) | tetramethyl thiuram monosulphide | Flexsys |
| Processing Aids | Struktol TS35 | aliphatic-aromatic soft resins | Schill + Seilacher |
| | Europrene Sol T 161 | SBS-thermoplastic Styrene Butadiene Styrene | Polimeri Europa |
| | Cumsol 27 | Aromatic oil | Kumho |
| Hydrolysis catalysts | Ufacid K | Dodecylbenzenesulphonic acid | Unger |

RRA 10 was prepared as previously described, and as depicted in FIG. 2. Stearic acid, zinc oxide, acetic acid, sulfur and all other chemicals and solvents were obtained from known vendors.

Carbon Black (HAF N330) was obtained from Cabot.

The System:

FIG. 1 presents a schematic illustration of an exemplary system for producing the modified nanoclays according to some embodiments of the present invention. An exemplary system 100 includes an Erlenmeyer flask 10, a reflux column 20 fitting onto flask 10, heating and magnetic stirring plate 30, immersion bath 40 placed on plate 30, magnet 50 in placed in flask 10, and thermometer 60 fitting into flask 10.

FIG. 2 presents a schematic illustration of a drying tray 200, for drying the modified nanoclays once obtained. An exemplary tray is made of a ceramic material.

Elastomeric Composite Properties Measurements:

Rheological Properties:

All rheological measurements were performed using a MDL D2000 Arc 1 (Monsanto) Rheometer, and were operated according to Manufacturer's instructions, at the indicated temperature.

Minimal Viscosity (mV or MV) is measured in a rheological test, and is expressed as the torque (lb/inch) applied to an elastomeric composite, before vulcanization.

Scorch time (t2) is the time (in minutes) required for an elastomeric composite to exhibit torque of 2 lb/inch upon vulcanization, as measured in a rheological test.

Optimum Vulcanization Time (t90) is the time (in minutes) required for an elastomeric composite to exhibit 90% of the maximal torque value, as a measured in a rheological test. Similarly, t100 is the time required for an elastomeric composition to exhibit the maximal torque value.

The term "tan" represents "Tangent δ", or the tangent modulus, which is the ratio of the viscous torque (S") and the elastomeric torque (S'), and is dimensionless. Tan can be measured as the slope of a compression stress-strain curve.

S1, is the maximal torque value.

S1-mV represents the difference between the maximal torque value (S1) and the minimal viscosity.

Mechanical Properties:

Mechanical measurements were performed according to standard (ASTM) procedures, as indicated.

Vulcanization time is the time required for achieving more than 90% of the maximal torque.

Elongation is the extension of a uniform section of a specimen (i.e., an elastomeric composite) expressed as percent of the original length as follows:

$$\text{Elongation \%} = \frac{\text{Final length} - \text{Original length}}{\text{Original length}} \times 100$$

Elongation was determined following the ASTM D412 standard.

Hardness is a resistance of an elastomeric composite to indentation, as measured under the specified conditions. Hardness ShA is Shore A hardness, determined following the ASTM D2240 standard using a digital Shore A hardness meter.

Tensile strength (or tensile) is a measure of the stiffness of an elastic substance, defined as the linear slope of a stress-versus-strain curve in uniaxial tension at low strains in which Hooke's Law is valid. The value represents the maximum tensile stress, in MPa, applied during stretching of an elastomeric composite before its rupture.

Modulus is a tensile stress of an elastomeric composite at a given elongation, namely, the stress required to stretch a uniform section of an elastomeric composite to a given elongation. This value represents the functional strength of the composite. M100 is the tensile stress at 100% elongation, M200 is the tensile stress at 200% elongation, etc.

Tear Strength is the maximum force required to tear an elastomeric composite, expressed in N per mm, whereby the force acts substantially parallel to the major axis of the composite.

Tensile strength, modulus and tear resistance were determined following the ASTM D412 standard.

Hchg ShA is the change on Shore A hardness upon ageing at 100° C. for 70 hours, and represents the hardness as measured upon ageing minus the hardness as measured before ageing.

Tchg % is the change, in percents, of the tear resistance upon ageing at 100° C. for 70 hours, and represents the difference between tear resistance upon ageing and before ageing, divided by the tear resistance before ageing, multiplied by 100.

Echg % is the change, in percents, of the elongation upon ageing at 100° C. for 70 hours, and represents the difference between elongation upon ageing and before ageing, divided by the elongation before ageing, multiplied by 100.

Yerzley Elasticity (Elast. Yerzley) is a measure of elasticity of an elastomeric composite as determined on a Yerzley device. It represents resilience, which is the ability of a material to absorb energy when it is deformed elastically, and release that energy upon unloading. The modulus of resilience is defined as the maximum energy that can be absorbed per unit volume without creating a permanent distortion.

Chemical Syntheses:

FIG. 3 is a background art figure presenting a reaction scheme for producing a modified NC, referred to herein as RRA 10. Commercially available MMT NCs, Cloisite 15A, are reacted with the mercaptosilane Si69, in acetone, and dodecylbenzensulfonic acid (Ufacid K), an efficient catalyst for hydrolysis and condensation of silane, is added until a pH 3 is obtained.

In some embodiments of the present invention, the synthesis outline depicted in FIG. 3 is followed, however, an antioxidant is added to the nanoclayes, the mixture is heated, and then a mercaptosilane, an acid and water are added, and the obtained mixture is further heated, as is exemplified in further detail hereinbelow.

The type of nanoclays, reaction solvents, anti-oxidants, acids (including presence and absence), accelerators (including presence and absence) and other additives (presence or absence) were modified in the various synthetic procedures presented herein.

Example 1

RRA 181-1

FIG. 4 presents a reaction scheme for preparing exemplary modified NCs according to some embodiments of the present invention, termed herein RRA181-1. To a suspension of Cloisite 15A in acetone was added, while stifling, IPPD (an antioxidant), and upon heating for one hour at 80° C., Si69, acid and water were added, and the reaction mixture was heated for 7 hours at 80° C.

Example 2

RRA 189-2

FIG. 5 presents a reaction scheme for preparing exemplary modified NCs according to some embodiments of the present invention, termed herein RRA 189-2. To a suspension of Cloisite 15A in acetone was added, while stifling, DDA (an antioxidant) and SBS (an accelerator), and upon heating for two hour at 80° C., Si69, acid and water were added, and the reaction mixture was heated for 7 hours at 80° C.

Example 3

RRA 190-5

FIG. 7 presents a reaction scheme for preparing exemplary modified NCs according to some embodiments of the present invention, termed herein RRA 190-5. To a suspension of Cloisite 15A in acetone was added, while stifling, DDA (an antioxidant) and SBS (an accelerator), and upon heating for two hour at 80° C., silica ($SiO_2$) in acetone was added and the mixture was heated for 10 hours at 90° C., prior to the addition of Si69 and water (no acid), and the reaction mixture was heated for 10 hours at 90° C.

As discussed hereinabove, without being bound to any particular theory, it is assumed that the added silica reacts with both, free hydroxy groups on the nanoclays surface and the mercaptosilane.

For comparison, Background art FIG. 6 presents a reaction scheme for preparing the modified NCs termed herein RRA 50R. Organomodified MMT NCs are heated in acetone and thereafter an already hydrolyzed mercaptosilane is added thereto and the reaction mixture is further heated.

Example 4

RRA 189-4

FIG. 8 presents a reaction scheme for preparing exemplary modified NCs according to some embodiments of the present invention, termed herein RRA 189-4. To a suspension of Cloisite 15A in acetone was added, while stifling, DDA (an antioxidant) and SBS (an accelerator), and upon heating for two hour at 80° C., Si69 and water (no acid) were added, and the reaction mixture was heated for 7 hours at 80° C.

It is noted that RRA 189-4 are prepared similarly to RRA 189-2 (see, Example 2) but without the addition of an acid.

Example 5

RRA 194-1

FIG. 9 presents a reaction scheme for preparing exemplary modified NCs according to some embodiments of the present invention, termed herein RRA 194-1. To a suspension of Cloisite 15A in chloroform was added, while stirring, IPPD (an antioxidant), and upon heating for two hour at 80° C., Si69 and water (no acid) were added, and the reaction mixture was heated for 7 hours at 80° C. Thereafter, the reaction mixture was poured onto a tray and dried for approximately 16 hours at room temperature.

Example 6

RRA 202-1 and RRA 206-2

FIG. 10 presents a reaction scheme for preparing exemplary modified NCs according to some embodiments of the present invention, termed herein RRA 202-1. To a suspension of Cloisite 15A in a mixture of 1:3 isopropyl alcohol:water was added, while stifling, IPPD (an antioxidant), and upon heating for two hour at 80° C., Si69 (no water and no acid) was added, and the reaction mixture was heated for 7 hours at 80° C. Thereafter, the reaction mixture was poured onto a tray and dried for approximately 16 hours at room temperature.

FIGS. 11A-C present comparative IR spectra of Cloisite Na (untreated), Cloisite 15A (treated with tallow ammonium) and RRA202-1, which demonstrate the differences in the spectral properties of the nanoclays as a result of the different surface chemistry of the nanoclays upon treatment.

RRA 206-2 was similarly prepared, while using a mixture of 3:1 isopropyl alcohol:water.

Example 7

RRA 194-2

FIG. 12 presents a reaction scheme for preparing exemplary modified NCs according to some embodiments of the present invention, termed herein RRA 194-2. To a suspension of Cloisite 15A in a mixture of chloroform:acetone 2:1 was added, while stifling, IPPD (an antioxidant), and upon heating for two hour at 80° C., Si69 and water (no acid) were added, and the reaction mixture was heated for 7 hours at 80° C.

Example 8

RRA 195-1

FIG. 13 presents a reaction scheme for preparing exemplary modified NCs according to some embodiments of the present invention, termed herein RRA 195-1. To a suspension of Cloisite 15A in a mixture of water:acetone 2:1 was added, while stirring, IPPD (an antioxidant), and upon heating for two hour at 80° C., Si69 (no water and no acid) was added, and the reaction mixture was heated for 7 hours at 80° C.

Example 9

Comparative Elastomeric Composites

In general, elastomeric composites are prepared by mixing an SBR rubber with modified nanoclays as described herein, and a vulcanization agent (sulfur), and optionally with other ingredients such as fillers (e.g., carbon black, zinc oxide), acid, processing aids, accelerators, etc., as indicated. The mixture is then subjected to vulcanization and rheological and mechanical measurements are performed, as described hereinabove.

The obtained modified NCs, termed herein RRA 181-1 (see, Example 1) were mixed with SBR rubber and carbon black (HAF N330), to produce SBR rubber composite. For comparison, the same rubber composite was prepared with RRA 10 (depicted in FIG. 3).

Table 1 below presents the ingredients of 5267-1 (SBR rubber composite comprising RRA 10) and of S257-2R (SBR rubber composite with RRA 181-1).

TABLE 1

| Ingredient | S267-1 | S257-2R |
|---|---|---|
| Synpol1502 | 100.00 | 100.00 |
| acid stearic | 1.00 | 1.00 |
| zinc oxide | 3.00 | 3.00 |
| HAF. N330 | 15.00 | 15.00 |
| RRA 10 | 17.50 | — |
| RRA 181-1 | — | 17.50 |
| sulfur | 1.60 | 1.60 |
| MBS | 1.30 | 1.30 |
| STRUKTOL TS35 | 1.14 | 1.14 |

Table 2 below presents the properties of the compositions S267-1 and S257-2R as measured at 150° C. Some key features are also shown in graphic form in FIG. 14.

TABLE 2

| | S267-1 | S257-2R |
|---|---|---|
| Rheological properties | | |
| mV lb-in | 0.79 | 1.06 |
| t2 min | 5.88 | 2.87 |
| t90 min | 25.43 | 23.29 |
| t100 min | 35.93 | 36.00 |
| S1 lb-in | 12.46 | 14.36 |
| tan | 0.035 | 0.032 |
| S1-mV | 11.67 | 13.30 |
| Mechanical properties | | |
| Vulc time min | 28.00 | 26.00 |
| Hardness ShA | 63 | 70 |
| Tensile MPa | 18.59 | 23.16 |
| Elongation % | 435 | 403 |
| M100 MPa | 2.69 | 5.06 |
| M200 MPa | 6.90 | 10.79 |
| M300 MPa | 11.00 | 16.66 |
| Hchg ShA | 9 | 6 |
| Tchg % | −24.15 | −15.28 |
| Echg % | −55.61 | −41.88 |
| Tear N/mm | 52.10 | 57.20 |

As can be seen in Table 2 and FIG. 14, addition of the amine antioxidant significantly improved the tear resistance, modulus at various stretching lengths, tensile strength and hardness, compared to previously discloses organomodified nanoclays. In addition, ageing properties of the nanoclays were improved.

Without being bound by any particular theory, it is assumed that the added mercaptosilane interacts with free hydroxy groups on the modified NCs surface and may further react with silica (if added to the rubber formulation). The mercaptosilane may undergo condensation in the presence of water, and thus may contribute to the mechanical strength of the resulting rubber.

It is to be noted that the reactions to prepare the modified NCs disclosed herein are not necessarily carried out to completion, since experiments have so far shown that after 7 hours reaction with the TESPT there were no significant improvements in the mechanical properties of the products.

Without being bound by any particular theory, it is assumed that by the addition of an antioxidant to the modified nanoclays (Cloisite 15A) before the addition of mercaptosilane (e.g., TESPT; Si69), the process of increasing distance between the layers of the NC (a process begun during production of the modified NC by treating MMT with quaternary tallow ammonium salt) continues, due to the long-chain residues of the amine antioxidant. Such "spacing" of the NC layers increases the surface area of the NCs and such that the silanization, by the mercaptosilane occurs on a larger surface.

Example 10

Comparative Elastomeric Composites without Carbon Black

Elastomeric composites devoid of carbon black (CB) were produced: S96-1G comprising (prior art) RRA 10, S266-1G comprising RRA 181-1 (see, Example 1), and S270-1G comprising RRA 189-2 (Example 2). Table 3 below lists the ingredients in the three elastomeric composites.

TABLE 3

| Ingredient | S96-1G | S266-1G | S270-1G |
|---|---|---|---|
| Synpol1502 | 100.00 | 100.00 | 100.00 |
| acid stearic | 1.00 | 1.00 | 1.00 |
| zinc oxide | 3.00 | 3.00 | 3.00 |
| RRA 10 | 10.00 | — | — |
| RRA 181-1 | — | 10.00 | — |
| RRA 189-2 | — | — | 10.00 |
| sulfur | 1.75 | 1.75 | 1.75 |
| Santocure TBBS | 1.00 | 1.00 | 1.00 |

Table 4 below presents the properties of the compositions S96-1G, S266-1G and S270-1G as measured at 170° C. Some key features are also shown in graphic form in FIG. 15.

TABLE 4

| | S96-1G | S266-1G | S270-1G |
|---|---|---|---|
| Rheological properties | | | |
| mV lb-in | 0.76 | 0.63 | 0.50 |
| t2 min | 2.52 | 1.27 | 1.45 |
| t90 min | 9.75 | 10.01 | 6.28 |
| S1 lb-in | 10.59 | 9.13 | 8.09 |
| tan | 0.029 | 0.023 | 0.022 |
| S1-mV | 9.83 | 8.50 | 7.59 |
| Mechanical properties | | | |
| Vulc time min | 12 | 13 | 9 |
| Hardness ShA | 48 | 57 | 55 |
| Tensile MPa | 10.40 | 10.40 | 10.61 |
| Elongation % | 519 | 327 | 454 |
| M200 MPa | 2.39 | 5.57 | 3.70 |
| M300 MPa | 3.12 | 3.54 | 3.19 |
| Tear N/mm | 24.4 | 39.2 | 39.1 |
| Elast. Yerzley % | 79.32 | 76.44 | 76.46 |

As can be seen in Table 4 and FIG. 15, and similarly to the elastomeric composites containing CB, elastomeric composite containing the modified NCs as disclosed herein, which comprise the amine antioxidant (DDA or IPPD) exhibited improved tear resistance, shear modulus at various stretching lengths, and hardness, with no essential change in elasticity. S266-1G and S270-1G exhibited similar tear resistance, tensile strength, hardness and elasticity. The main improvement resulting from the incorporation of DDA and SBS over incorporation of IPPD was increasing scorch time (t2) and reducing of vulcanization time (DDA as amine is also a strong accelerator). However, IPPD has anti-ozone properties that may improve the wear resistance of the elastomeric composites.

Example 11

Additional Comparative Elastomeric Composites Devoid of CB

Additional exemplary elastomeric composites were prepared as described in Example 10 hereinabove, while replacing the accelerator TBBS by MBS.

The modified RRA 190-5, which was prepared while using MBS and into which silica was added during preparation was compared with RRA 50R, previously reported modified NCs into which silica was also added during preparation (see, Example 3 hereinabove).

Table 5 below lists the ingredients used to prepare the elastomeric composites termed herein S278-1G, that includes the previously reported RRA 50R, S274-5G, which includes RRA 190-5.

TABLE 5

| Ingredient | S278-1G | S274-5G |
|---|---|---|
| Synpol1502 | 100.00 | 100.00 |
| acid stearic | 1.00 | 1.00 |
| zinc oxide | 3.00 | 3.00 |
| HAF. N330 | 15.00 | 15.00 |
| RRA 50R | 10.00 | — |
| RRA 190-5 | — | 10.00 |
| sulfur | 1.75 | 1.75 |
| STRUKTOL MBS | 1.00 | 1.00 |

Table 6 below presents the properties of the compositions S278-1G and S274-5G as measured at 150° C. Some key features are also shown in graphic form in FIG. 16.

TABLE 6

| | S278-1G | S274-5G |
|---|---|---|
| Rheological properties | | |
| mV lb-in | 0.55 | 0.61 |
| t2 min | 5.14 | 3.53 |
| t90 min | 23.98 | 21.12 |
| tan | 0.023 | 0.022 |
| S1-mV | 8.69 | 7.71 |
| Mechanical properties | | |
| Vulc time min | 26 | 24 |
| Hardness ShA | 52 | 55 |
| Tensile MPa | 9.94 | 11.08 |
| Elongation % | 538 | 453 |
| M200 MPa | 2.48 | 3.11 |
| M300/M100 | 2.43 | 3.11 |
| Tear N/mm | 35.72 | 44.40 |
| Elast. Yerzley % | 80.42 | 78.89 |

As can be seen in Table 6, the elastomeric composites made with the accelerant MBS exhibited similar features to those observed with elastomeric composites made with the accelerant TBBS, namely, a general improvement in physical properties as a result of using the modified nanoclays as disclosed herein was observed, particularly a significant improvement of tear resistance, tensile strength and modulus, while retaining elasticity.

It is to be noted that in the modified nanoclays used in forming the elastomeric composite S274-5G, RRA 190-5, an accelerator SBS and a filler $SiO_2$ were added to the nanoclays composition-of-matter. The role of $SiO_2$ addition is discussed hereinabove. It is further assumed that when an accelerator is added during nanoclays formation, the properties of an elastomeric composite containing such nanoclays are further improved.

Example 12

Comparative Elastomeric Composites Containing Modified NCs Prepared in the Presence or Absence of an Acid The modified NCs RRA 181-1 and RRA189-2, described in Examples 1 and 2 hereinabove, were prepared using acetic acid as a catalyst for the reaction of the mercaptosilane with the NCs. However, RRA 190-5 was prepared without use of the acetic acid or any other acid catalyst. Similarly, RRA 189-4 (see, Example 4) differs from RRA-189-2 (see, Example 2) by the absence of addition of an acid catalyst (acetic acid) during NCs modification.

The effect of the presence of an acid catalyst during modified NCs preparation on the properties of elastomeric composites containing the modified NCs is presented herein by comparing various elastomeric composites containing RRA-189-2 or RRA-189-4.

Table 7 lists the ingredients of the non-CB elastomeric composites S270-5G and S270-7G.

TABLE 7

| Ingredient | S270-5G | S270-7G |
|---|---|---|
| Synpol1502 | 100.00 | 100.00 |
| acid stearic | 1.00 | 1.00 |
| zinc oxide | 3.00 | 3.00 |
| RRA 189-2 | 8.00 | — |
| RRA 189-4 | — | 8.00 |
| sulfur | 1.75 | 1.75 |
| SANTOCURE MBS | 1.00 | 1.00 |

Table 8 presents the properties of the elastomeric composites S270-5G and S270-7G, as measured at 150° C.

TABLE 8

| | S270-5G | S270-7G |
|---|---|---|
| Rheological properties | | |
| mV lb-in | 0.64 | 0.64 |
| t2 min | 3.47 | 3.54 |
| t90 min | 15.57 | 14.63 |
| tan | 0.021 | 0.022 |
| S1-mV | 7.38 | 7.56 |
| Mechanical properties | | |
| Vulc time min | 18 | 17 |
| Hardness ShA | 55 | 54 |
| Tensile MPa | 10.18 | 11.04 |
| Elongation % | 438 | 478 |

TABLE 8-continued

| | S270-5G | S270-7G |
|---|---|---|
| M200 MPa | 3.58 | 3.53 |
| M300/M100 | 3.27 | 3.43 |
| Tear N/mm | 34.70 | 35.70 |

Table 9 lists the ingredients of CB-containing elastomeric composites S268-2 (containing RRA 189-2) and S269-2 (containing RRA 189-4).

TABLE 9

| Ingredient | S268-2 | S269-2 |
|---|---|---|
| Synpol1502 | 100.00 | 100.00 |
| acid stearic | 1.00 | 1.00 |
| zinc oxide | 3.00 | 3.00 |
| HAF N330 | 15.00 | 15.00 |
| RRA 189-2 | 25.54 | — |
| RRA 189-4 | — | 25.54 |
| sulfur | 1.90 | 1.90 |
| SANTOCURE MBS | 1.00 | 1.00 |
| Structol TS35 | 1.14 | 1.14 |

Structol TS35 is a dispersant.

Table 10 presents the properties of the elastomeric composites S268-2 and S269-2, as measured at 150° C.

TABLE 10

| | S268-2 | S269-2 |
|---|---|---|
| Rheological properties | | |
| mV lb-in | 0.95 | 0.89 |
| t2 min | 2.22 | 2.42 |
| t90 min | 23.36 | 23.95 |
| tan | 0.031 | 0.034 |
| S1-mV | 13.73 | 13.36 |
| Mechanical properties | | |
| Vulc time min | 26 | 26 |
| Hardness ShA | 72 | 70 |
| Tensile MPa | 23.89 | 24.70 |
| Elongation % | 407 | 460 |
| M200 MPa | 12.28 | 10.72 |
| M300/M100 | 2.66 | 2.79 |
| Tear N/mm | 61.30 | 57.90 |

Table 11 lists the ingredients of elastomeric composites S269-11 (containing RRA 189-2) and S269-21 (containing RRA 189-4), both containing CB and silica.

TABLE 11

| Ingredient | S269-11 | S269-21 |
|---|---|---|
| Synpol1502 | 100.00 | 100.00 |
| acid stearic | 1.00 | 1.00 |
| zinc oxide | 3.00 | 3.00 |
| HAF N330 | 15.00 | 15.00 |
| RRA 189-2 | 25.54 | — |
| RRA 189-4 | — | 25.54 |
| PERKASIL KS 408 | 10.00 | 10.00 |
| sulfur | 1.90 | 1.90 |
| SANTOCURE MBS | 1.00 | 1.00 |
| Structol TS35 | 1.14 | 1.14 |

Table 12 presents the properties of the elastomeric composites S269-11 and S269-21, as measured at 150° C.

TABLE 12

| Rheological properties | S268-2 | S269-2 |
|---|---|---|
| mV lb-in | 1.66 | 1.63 |
| t2 min | 1.94 | 2.15 |
| t90 min | 20.16 | 19.94 |
| tan | 0.049 | 0.050 |
| S1-mV | 13.88 | 13.70 |
| Mechanical properties | S270-5G | S270-7G |
| Vulc time min | 23 | 23 |
| Hardness ShA | 71 | 71 |
| Tensile MPa | 24.00 | 25.30 |
| Elongation % | 448 | 412 |
| M200 MPa | 9.51 | 11.42 |
| M300/M100 | 3.48 | 3.38 |
| Tear N/mm | 56.90 | 69.60 |

The data presented in Tables 8-12 indicate that in some composites, adding acetic acid during preparation of modified NCs may improve the elastomeric composites; however, in other compositions omitting the acetic acid may actually overall improve the properties of the elastomeric composites. An improvement of tensile strength and tear resistance is apparent in the elastomeric composites S270-7G and S269-21, in which the modified NC is prepared without acetic acid (RRA 189-4). It is noted that a particularly high tear threshold, which is known as suitable for e.g., tire applications, was observed for S269-21, despite the low CB content of the composite (15 phr).

Example 13

Elastomeric Composites Containing Modified NCs Prepared with and without Silica

The effect of the addition of silica during preparation of the modified NCs as described herein can be seen while comparing the properties of S270-7G, which contain RRA 190-5 (see, Table 8) and S274-5G, which contain RRA 189-4 (see, Table 6). As described and discussed hereinabove, silica is added during the preparation of RRA 190-5. S274-5G, containing RRA 190-5, has a significantly higher tear threshold, and higher tensile strength, compared with S270-7G, indicating that the addition of silica during the preparation of modified NCs as described herein beneficially affect the strength of elastomeric composites containing the modified NCs as described herein.

Example 14

Elastomeric Composites Containing Modified NCs Prepared Using Various Solvents

The reaction of preparing the modified NCs as described herein was initially performed in acetone as a solvent, and the effect of replacing the acetone with other organic solvents or with a water:organic solvent mixture as studied.

Two similarly modified NCs were prepared as generally described hereinabove, one in which the solvent was chloroform (RRA 194-1, see, Example 5), and another in which the solvent was a mixture of isopropanol (IPA) and water (RRA 202-1, see, Example 6). All other ingredients and conditions used for preparing these NCs were the same.

Elastomer composites were prepared using these NCs, as depicted in Table 13.

TABLE 13

| Ingredient | S298-1G | S311-4G |
|---|---|---|
| Synpol1502 | 100.00 | 100.00 |
| acid stearic | 1.00 | 1.00 |
| zinc oxide | 3.00 | 3.00 |
| RRA 194-1 | 10.00 | — |
| RRA 202-1 | — | 10.00 |
| sulfur | 1.75 | 1.75 |
| SANTOCURE MBS | 1.00 | 1.00 |

Table 14 presents the properties of the elastomeric composites S298-1G and S311-4G, as measured at 150° C. Some key features are also shown in graphic form in FIG. 17, further comparing to S274-5G, containing RRA 190-5.

TABLE 14

| | S298-1G | S311-4G |
|---|---|---|
| Rheological properties | | |
| mV lb-in | 0.76 | 0.86 |
| t2 min | 3.79 | 3.67 |
| t90 min | 17.70 | 14.48 |
| tan | 0.028 | 0.001 |
| S1-mV | 9.90 | 7.69 |
| Mechanical properties | | |
| Vulc time min | 20.00 | 17.00 |
| Hardness ShA | 55 | 56 |
| Tensile MPa | 12.36 | 11.04 |
| Elongation % | 427 | 420 |
| M100 MPa | 2.45 | 2.43 |
| M200 MPa | 4.91 | 4.81 |
| M300 MPa | 7.87 | 7.39 |
| M300/M100 | 3.21 | 3.04 |
| Tear N/mm | 76.16 | 76.26 |

As can be seen in Table 14 and FIG. 17, the elastomeric composites S298-1G and S311-4G exhibit similar properties. These elastomeric composites, which are devoid of CB, were further comparable in their properties with S274-5G (see, Table 6 and FIG. 16), which contains CB and nanoclays prepared in acetone, and MBS and silica were added during the NCs preparation (see, RRA 190-5 in Example 3 hereinabove). Thus, since it is shown that silica appears to augment the strength of the elastomeric composites, and since the hybrids in S298-1G and S311-4G do not contain silica, it appears that using a mixture of IPA and water or chloroform in preparing the NCs is superior to acetone. It is noted that both IPA and chloroform are much less of a fire hazard compared with acetone.

The effect of the solvent used for preparing the modified nanoclays was further studied. RRA 194-2 (see, Example 7), was prepared using a chloroform:acetone (2:1) mixture, and RRA 195-1 (see, Example 8), was prepared using a water:acetone (2:1) mixture, and both were prepared using comparable conditions and ingredients as RRA 194-2 and RRA 202-1.

Table 15 below lists the properties of elastomeric composites, S298-2G and S302-1G, containing the nanoclays RRA 194-2 and RRA 195-1, respectively.

TABLE 15

|  | S298-2G | S302-1G |
| --- | --- | --- |
| Rheological properties | | |
| mV lb-in | 0.76 | 0.82 |
| t2 min | 3.05 | 4.00 |
| t90 min | 17.17 | 20.85 |
| tan | 0.025 | 0.031 |
| S1-mV | 10.64 | 10.39 |
| Mechanical properties | | |
| Vulc time min | 20.00 | 23.00 |
| Hardness ShA | 56 | 55 |
| Tensile MPa | 10.70 | 9.09 |
| Elongation % | 387 | 403 |
| M100 MPa | 2.60 | 2.08 |
| M200 MPa | 5.06 | 3.95 |
| M300 MPa | 7.86 | 6.04 |
| M300/M100 | 3.02 | 2.90 |
| Elast. Yerzley % | 78.05 | 78.35 |

FIG. 18 presents comparative plots showing readings from a rheometer (Alpha Technologies MDR2000) at 150° C. as obtained for these elastomeric composites (containing RRA 194-2 and RRA 195-1), and of the elastomeric composites S209-1G and S311-4G, containing RRA 194-2 and RRA 202-1, respectively). FIG. 19 presents comparative stress-strain curves of these elastomeric composites.

It can be seen from the obtained data that all elastomeric composites containing modified nanoclays prepared while using a solvent other than acetone exhibited similar properties as those containing RRA 190-5, as discussed hereinabove, without using a filler. An improvement in vulcanization time was also observed for these elastomeric composites.

Thus, it is shown that production of modified nanoclays as described herein, while using in solvent mixtures containing water, such as the a mixture of IPA:water and acetone:water, may be preferable over use of acetone as a solvent.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composition-of-matter comprising an organomodified nanoclay being in association with an amine-containing compound featuring anti-oxidation activity, said organomodified nanoclay being a nanoclay in association with a surface modifying agent, wherein said association with said amine-containing compound featuring anti-oxidation activity is effected by reacting said organomodified nanoclay with said amine-containing compound featuring anti-oxidation activity, in a solvent, at an elevated temperature, said solvent being selected from the group consisting of an organic solvent and a mixture of an organic solvent and water, wherein said surface modifying agent is an organic ammonium salt and said amine-containing compound featuring anti-oxidant activity is a para-phenylenediamine (p-PDA).

2. The composition-of-matter of claim 1, wherein said nanoclay is montmorillonite.

3. The composition-of-matter of claim 1, wherein said cationic surfactant is selected from the group consisting of a tallow ammonium salt and a tallow amminium salt.

4. The composition-of-matter of claim 1, wherein said organomodified nanoclay is organomodified montmorillonite.

5. The composition-of-matter of claim 4, wherein said organomodified nanoclay is selected from the group consisting of montmorillonite modified by dimethyl, benzyl, hydrogenated tallow, quaternary ammonium; montmorillonite modified by dimethyl, hydrogenated tallow, quaternary ammonium; montmorillonite modified by dimethyl, dihydrogenated tallow, quaternary ammonium; montmorillonite modified by dimethyl, 2-ethylhexyl, hydrogenated tallow, quaternary ammonium; and montmorillonite modified by methyl, bis(2-hydroxyethyl), hydrogenated tallow, quaternary ammonium.

6. The composition-of-matter of claim 4, wherein said organomodified nanoclay comprises montmorillonite modified by dimethyl, hydrogenated tallow, quaternary ammonium.

7. The composition-of-matter of claim 1, wherein said para-phenylene diamine compound is selected from the group consisting of a N,N-dialkyl-p-PDA and a N-alkyl-N-aryl-p-PDA.

8. The composition-of-matter of claim 1, further comprising a silyl-containing compound.

9. The composition-of-matter of claim 8, wherein the silyl-containing compound is a mercaptosilyl compound.

10. The composition-of-matter of claim 8, wherein said silyl-containing compound is a siloxane.

11. The composition-of-matter of claim 9, wherein said silyl-containing compound is a mercaptosiloxane.

12. The composition-of-matter of claim 1, further comprising silica.

13. The composition-of-matter of claim 1, further comprising an accelerator.

14. The composition-of-matter of claim 1, comprising a plurality of modified nanoclays.

15. A process of preparing the composition-of-matter of claim 1, the process comprising:
reacting said organomodified nanoclay and said amine-containing compound featuring an anti-oxidation activity in a solvent at an elevated temperature, to thereby obtain said modified nanoclay, said organomodified nanoclay being a nanoclay in association with a surface modifying agent,
thereby obtaining the composition-of-matter.

16. The process of claim 15, wherein said composition-of-matter further comprises a silyl-containing compound, the process, comprising reacting said organomodified nanoclay, said amine-containing compound and said silyl-containing compound, in said solvent, to thereby obtain the modified nanoclay.

17. The process of claim 16, comprising:
reacting said organomodified nanoclay, said amine-containing compound in said solvent; and
subsequent to said reacting reacting the same with a silyl-containing compound in said solvent.

18. The process of claim 15, wherein aid composition-of-matter further comprises an accelerator, the process further comprising adding said accelerator, prior to or concomitant with, reacting said organomodified nanoclay and said amine-containing compound.

19. The process of claim 15, wherein said composition-of-matter further comprises silica, the process further comprising adding said silica, subsequent to reacting said organomodified nanoclay and said amine-containing compound.

20. The process of claim 15, wherein said solvent is selected from the group consisting of an organic solvent and a mixture of an organic solvent and water.

21. The process of claim 20, wherein said organic solvent is selected from the group consisting of acetone, isopropyl alcohol, chloroform and any combination thereof.

22. The process of claim 15, wherein said reacting comprises stirring at an elevated temperature.

23. The process of claim 15, further comprising drying the composition-of-matter.

24. An elastomeric composite comprising an elastomer and the composition-of-matter of claim 1.

25. The elastomeric composite of claim 24, wherein said elastomer is selected from the group consisting of an SBR elastomer, an isoprene elastomer, a polybutadiene elastomer, a butadiene acrylonitile elastomer, an EPDM elastomer, a natural rubber and any combination thereof.

26. The elastomeric composite of claim 24, being devoid of carbon black.

27. The elastomeric composite of claim 24, further comprising carbon black at a concentration lower than 20 phr.

28. An article-of-manufacturing, comprising the elastomeric composition of claim 24.

* * * * *